United States Patent
Ikeda et al.

(10) Patent No.: US 6,320,605 B1
(45) Date of Patent: *Nov. 20, 2001

(54) IMAGE INFORMATION PROCESSING APPARATUS AND METHOD

(75) Inventors: Yuichi Ikeda, Numazu; Nobuatsu Sasanuma, Mishima; Tetsuya Atsumi, Susono; Yasuhiro Saito, Shizuoka-ken, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/149,279

(22) Filed: Sep. 9, 1998

(30) Foreign Application Priority Data

Sep. 12, 1997 (JP) .................................................. 9-248983

(51) Int. Cl.$^7$ ................................. B41J 2/47; B41J 2/355
(52) U.S. Cl. ............................................ 347/252; 347/183
(58) Field of Search ................................... 347/240, 251, 347/252, 131, 133, 132, 115, 119, 183

(56) References Cited

U.S. PATENT DOCUMENTS

| | | | |
|---|---|---|---|
| 4,642,681 | | 2/1987 | Ikeda ........................................ 358/79 |
| 5,485,191 | * | 1/1996 | Gu .......................................... 347/131 |
| 5,495,278 | * | 2/1996 | Oda et al. .............................. 347/252 |
| 5,677,725 | * | 10/1997 | Honbo et al. ......................... 347/252 |
| 5,724,090 | * | 3/1998 | Tanaka et al. ........................ 347/251 |
| 5,748,328 | | 5/1998 | Usami et al. .......................... 358/298 |
| 6,037,966 | * | 3/2000 | Sakakibara ............................ 347/252 |

* cited by examiner

Primary Examiner—N. Le
Assistant Examiner—K. Feggins
(74) Attorney, Agent, or Firm—Fitzpatrick, Cella, Harper & Scinto

(57) ABSTRACT

An image processing apparatus for performing pulse-width modulation processing based on input image data. A maximum pulse width of a pulse signal, which can be outputted as a modulation signal obtained by the pulse width modulation, is changed in accordance with an image processing mode.

25 Claims, 22 Drawing Sheets

US 6,320,605 B1

IMAGE INFORMATION PROCESSING APPARATUS AND METHOD

BACKGROUND OF THE INVENTION

1. Field of the Invention

The present invention relates to an image information processing apparatus and method for performing pulse width modulation based on input image data.

2. Description of the Invention

In the field of image processing apparatuses which correct input image data in accordance with correction data stored in a look-up table (LUT) or the like and form an image based on the corrected image data, a technique to change the density of the output image by changing the correction data in the LUT has been proposed.

Further, in the field of electrophotographic image processing apparatuses, a technique to change the density of an output image by changing the contrast potential of an electrostatic drum upon image formation has been proposed.

However, in the image processing apparatus that changes the correction data in the LUT, even if the correction data in the LUT is changed, it is impossible to change the maximum density that the image formation unit of the image processing apparatus can physically output. For this reason, the density of an output image can be reduced by changing the characteristic of the correction data, while the density cannot be changed over the above-described maximum density which can be physically outputted by the image formation unit.

Further, in the image processing apparatus that changes the density of an output image by changing the above-described contrast potential, if the conventional apparatus can change the resolution, it is impossible to change the maximum density of the output image for each resolution.

SUMMARY OF THE INVENTION

In view of the above situation, one of the objects of the present invention is to provide an image processing apparatus and method which change the maximum density of an output image and prevent degradation of tonality representation upon formation of the output image.

To attain the object, the present invention provides an image processing apparatus/method which generates a pulse signal having a pulse width corresponding to input image data by performing pulse width modulation based on the input image data. At this time, the maximum pulse width of the pulse signal which can be outputted can be changed in accordance with an image processing mode.

Further, according to one aspect of the present invention, the image processing apparatus/method according to the present invention inputs image signals for a plurality of color components constituting a color image, and generates pulse width modulation signals by performing pulse width modulation based on the image signals. Each pulse width modulation signal has a maximum pulse width determined for each color component.

Further, according to another aspect of the present invention, the image processing apparatus/method according to the present invention inputs a first color component signal and a second color component signal constituting a color image signal, compares the input signals with a pattern signal of a predetermined period and generates pulse width modulation signals. At this time, the relative relation between the first color component signal and the pattern signal is different from that between the second color component signal and the pattern signal such that the pulse width modulation signals have different possible maximum pulse widths for first and second color components.

Other objects, features and advantages of the invention will be apparent from the following description taken in conjunction with the accompanying drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

<Digital Copying machine>

First, the construction of a digital copying machine and its image formation operation will be described with reference to FIGS. 1 and 2.

Figure 1:
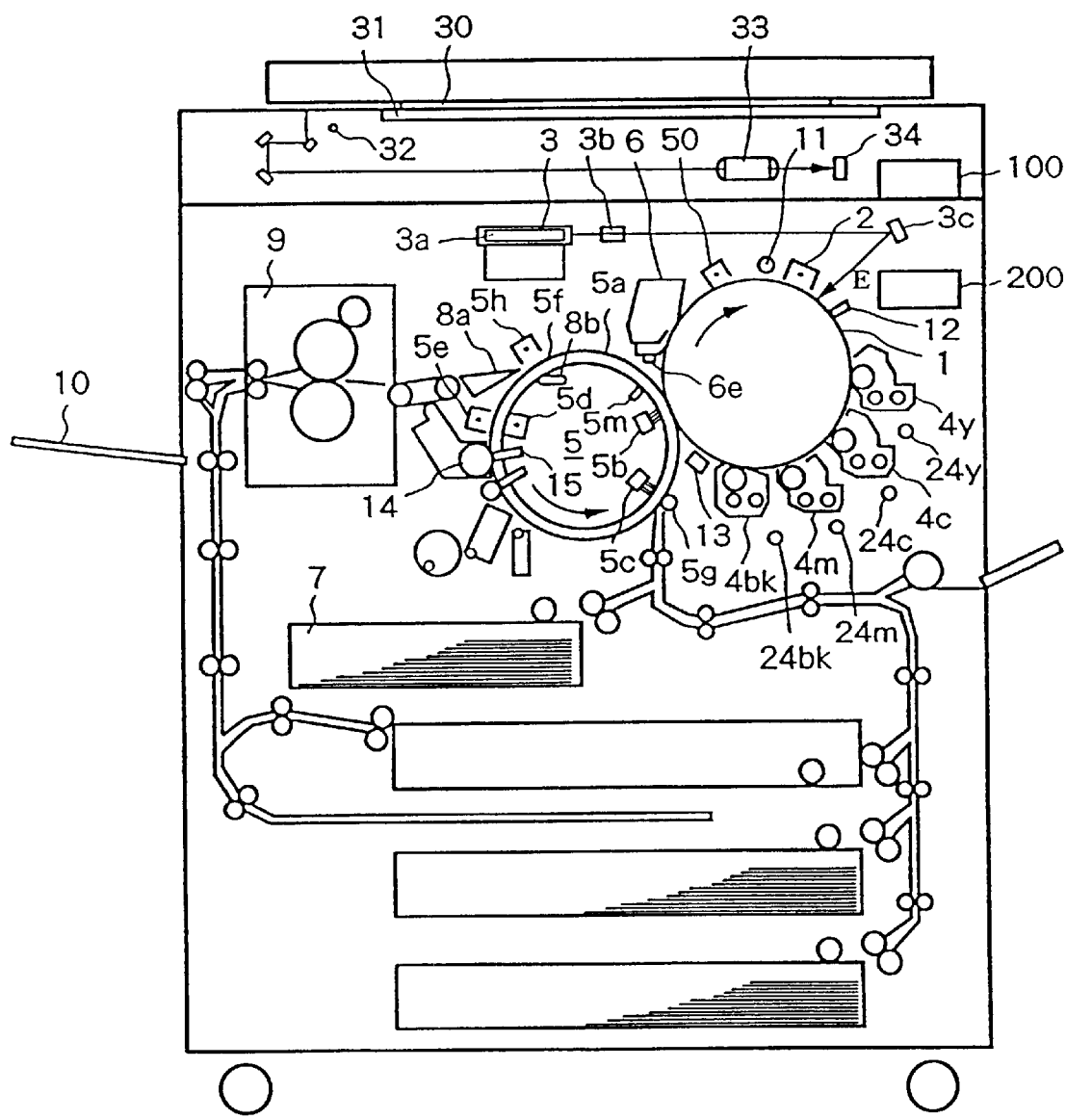
FIG. 1 is a cross sectional view showing the schematic structure of a digital copying machine as a first embodiment of the present invention.

FIG. 1 is a cross sectional view showing the schematic structure of the digital copying machine according to the first embodiment of the present invention.

Figure 2:
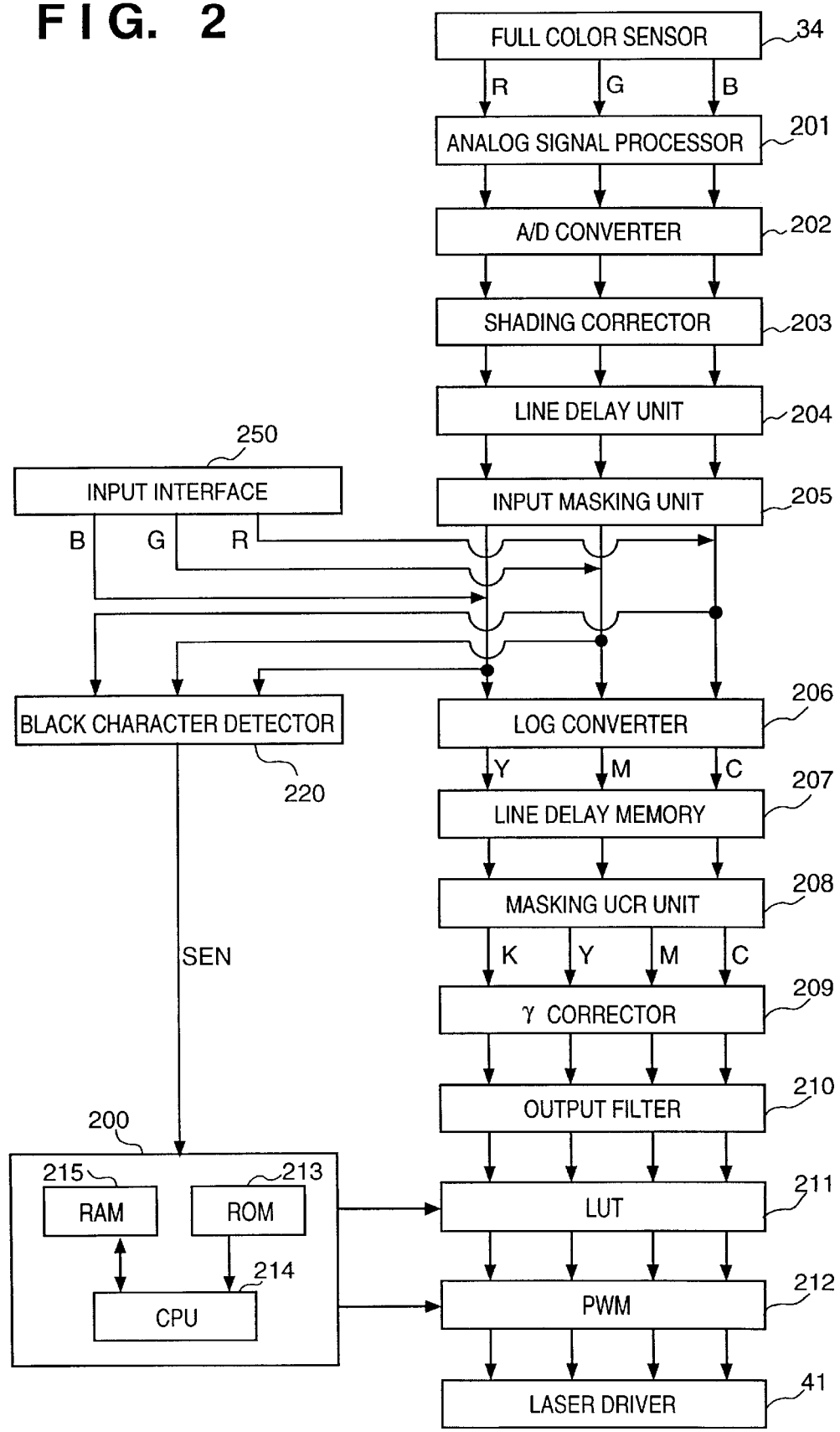
FIG. 2 is a block diagram showing the construction of image formation processing unit in the digital copying machine as the first embodiment.

FIG. 2 is a block diagram showing the construction of image formation processing unit in the digital copying machine of the first embodiment.

As shown in FIG. 1, the digital copying machine comprises a reader which reads an original image, and a printer which reproduces an original image on a print sheet based on an image signal of the original image read by the reader. The operation of the reader and that of the printer as described below are controlled by controllers 100 and 200. Note that the controller 200 has a CPU 214, and performs control in accordance with a program pre-stored in a ROM 213. Also, the controller 100 has a CPU (not shown), and performs control in accordance with a program pre-stored in a ROM (not shown).

At the reader, when a copy start key (not shown) is depressed, the controller 100 starts exposure scanning by an exposure lamp 32 with respect to an original 30 placed on a glass platen 31. Then obtained reflected light image from the original 30 is converged by a full color sensor 34.

In the full color sensor 34, R (red), G (green) and B (blue) line sensors are arranged in a predetermined intervals in a subscanning direction. The line sensors respectively have an array of photoreception devices. The full color sensor 34 decomposes the input reflected light image from the original 30 into a plurality of pixels by a plurality of photoelectric converting devices, and generates photoelectric conversion signals (color separation image signals) in correspondence with the densities of the respective pixels.

In FIG. 2, an analog signal processor 201 performs gain and offset control on the image signals outputted from the full color sensor 34, and an A/D converter 202 converts the signals, for respective color components, to e.g., 8-bit (0 to 255 level: 256 tone levels) RGB digital signals.

The RGB digital signals are inputted into a shading corrector 203. The shading corrector 203 performs general shading correction on the input RGB digital signals to optimize the gain in correspondence with each of the arrayed photoreception devices in the full color sensor 34 so as to remove variation of sensitivities of the photoreception devices.

A line delay unit 204 corrects spatial shift included in the image signals outputted from the shading corrector 203. The spatial shift is caused by the arrangement of the line sensors at the predetermined intervals in the subscanning direction in the full color sensor 34. More specifically, with the B (blue) color component signal as a reference signal, the R (red) and G (green) color component signals are line-delayed in the subscanning direction, so that the phases of the three color component signals are synchronized.

An input masking unit 205 converts the color space of the image signals outputted from the line delay unit 204 into, e.g., NTSC-RGB standard color space, by matrix calculation as in the following expression (1). That is, the color space of the respective color component signals outputted from the full color sensor 34, determined by spectral characteristics of filters for the respective color components, are converted into the NTSC-RGB standard color space.

$$\begin{pmatrix} R_0 \\ G_0 \\ B_0 \end{pmatrix} = \begin{pmatrix} a11 & a12 & a13 \\ a21 & a22 & a23 \\ a31 & a32 & a33 \end{pmatrix} \begin{pmatrix} R_i \\ G_i \\ B_i \end{pmatrix} \quad (1)$$

$R_o, G_o, B_o$: output image signals $R_i, G_i, B_i$: input image signals

An input interface 250 inputs color image data from an external device (not shown) such as a computer in accordance with necessity.

A LOG converter 206 comprises a look-up table (LUT) such as an ROM (not shown), and converts the RGB luminance signals outputted from the input masking unit 205 into CMY density signals.

A black character detector 220 detects a black character area included in an original image based on image data representing the original image, from the input masking unit 205 or image data inputted via the input interface 250 from the external device, and outputs a control signal SEN to the controller 200 in accordance with the result of detection. Note that the method for detecting the black character area is generally known by a preceding proposal by the present applicant, and therefore the explanation of the detection method will be omitted.

A line delay memory 207 delays the image signals outputted from the LOG converter 206 for a period (line delay period) to generate control signals UCR, FILTER, SEN and the like by the black character detector 220, based on the output from the input masking unit 205.

The control signal UCR is a control signal to control a masking UCR unit 208. The control signal FILTER is a control signal used for performing edge enhancement by an output filter 210.

The masking UCR unit 208 extracts a black component signal K from the image signals outputted from the line delay memory 207. Further, to correct color mixture of printing color material in the printer, the masking UCR unit 208 performs matrix calculation on the MCYK image signals, to output, e.g., 8-bit M, C, Y and K frame-sequential color component image signals at each reading operation by the reader. Note that matrix coefficients used in the matrix calculation are set by the CPU (not shown) in the controller 100.

A γ corrector 209 performs density correction on the image signals outputted from the masking UCR unit 208 so as to adjust the image signals in correspondence with ideal tonality characteristic of the printer. The output filter (spatial filter processor) 210 performs edge enhancement or smoothing processing on the image signals outputted from the γ corrector 209 in accordance with the control signal from the CPU (not shown) of the controller 100.

An LUT 211, including an LUT (not shown) to control the density of an output image to correspond to that of the original image, and an LUT according to another embodiment of the present invention to be described later, comprises a RAM and the like. Data of these tables are pre-stored in the ROM 213, for example, and set in the respective LUT's by the CPU 214.

Figure 3:
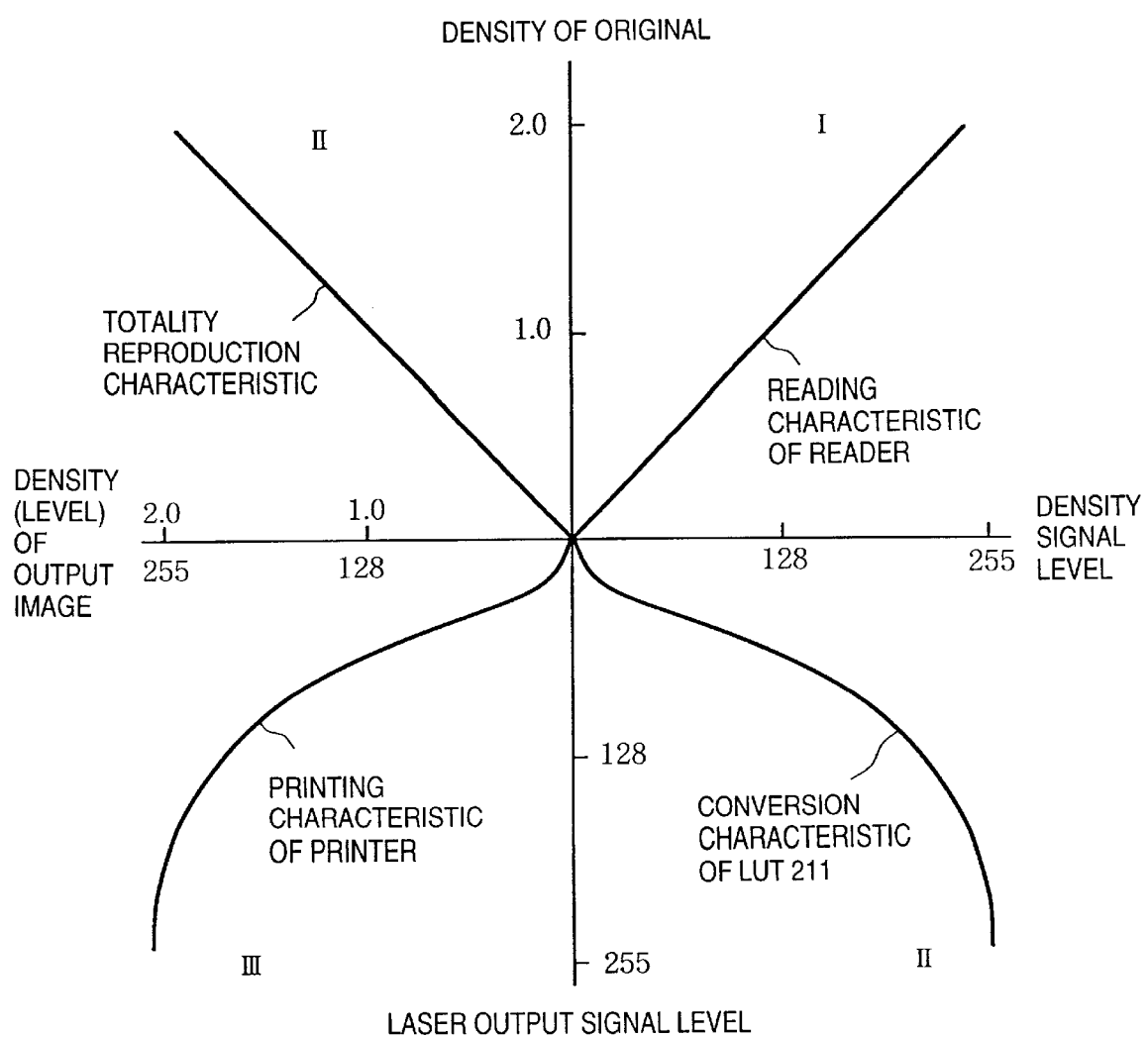
FIG. 3 is a graph explaining characteristics in respective processes of original-image representation by the digital copying machine as the first embodiment.

FIG. 3 is a graph explaining characteristics in respective processes of original-image representation by the digital copying machine according to the first embodiment.

In FIG. 3, the first region I shows a reading characteristic of the reader which converts the density of an original into a density signal. The second region II shows a conversion characteristic of the LUT 211 to convert the density characteristic of the density signal from the reader. The third region III shows a printing characteristic of the printer which converts a laser output signal into output density. The fourth region IV shows the relation between the density of the original image and that of the output image by the printer, i.e., the tonality reproduction characteristic of the digital copying machine. Note that as the digital copying machine performs 8-bit digital processing, the number of tone levels is 256. Further, the density of the original and that of the output image are represented by values obtained by measurement using a densitometer on the market (hereinafter, the values are obtained by using this densitometer).

In the present embodiment, to correct the tonality representation characteristic shown in the fourth region IV to an approximately linear characteristic, a nonlinear portion of the printing characteristic in the third region III is corrected by the conversion characteristic of the LUT 211 in the second region II.

The pulse width modulator (PWN) 212 outputs a pulse signal having a pulse width corresponding to the level of an image signal inputted from the LUT 211, and the pulse signal is inputted into a laser driver 41 (laser driver 3 in FIG. 1) which drives a laser light source (not shown).

In FIG. 1, laser light E emitted from a semiconductor laser of the laser driver 3 is swept by a rotary polygon mirror 3a, and spot-focused on an electrostatic drum (photoreceptor drum) 1 by a lens 3b such as an f/θ lens and a fixed mirror 3c which direct the laser light E toward the electrostatic drum 1. Then, the laser light E scans the electrostatic drum 1 in a direction approximately parallel to a rotational axis of the electrostatic drum (main scanning direction). Thus, the laser light E forms an electrostatic latent image by repeatedly scanning the electrostatic drum 1 in a rotational direction of the electrostatic drum (subscanning direction).

In the printer, the electrostatic drum 1 has amorphous silicon, selen, OPC and the like on its surface, and is held rotatably in a direction represented by the arrow in FIG. 1. The exposure lamp 11, a corona charger 2, a laser driver 3 (a laser-exposure optical system), a surface potential sensor 12, four developing units 4y, 4c, 4m, 4bk for different colors, a light quantity detection unit 13 on the electrostatic drum 1, a transfer unit 5 and a cleaning unit 6 are provided around the electrostatic drum 1.

In the printer, prior to image formation, the L[]z controller 200 rotates the electrostatic drum 1 in the direction represented by the arrow in FIG. 1, then destaticizes the electrostatic drum 1 by using the exposure lamp 11, and uniformly charges the drum by using the corona charger 2. Thereafter, the electrostatic drum 1 is exposure-scanned by the laser light E modulated in accordance with the above-described image information signal. Thus, an electrostatic latent image, having a characteristic of representing tonality per a unit area, is formed on the electrostatic drum 1 in accordance with the image information signal.

The developing units 4y, 4c, 4m and 4bk develop the electrostatic latent image on the electrostatic drum 1 by using yellow, cyan, magenta and black color toner as printing material. More specifically, the controller 200 forms resin-based and negative-charged visible images (toner images) on the electrostatic drum 1 by inversion-developing the electrostatic latent image formed on the electrostatic drum 1 with two-component developer including toner and carrier, by using the predetermined developing units 4y, 4c, 4m and 4bk. Each toner is formed by diffusing printing material of each color in a binder of styrene copolymer resin. The respective developing units are arranged to approach the electrostatic drum 1 by turns in accordance with the separated color by operations of eccentric cams 24y, 24c, 24m and 24bk. Note that the inversion development is a developing method to visualize a latent image by attaching toner charged in the same polarity as that of the latent image to a light-exposed area of a photoreceptor member.

In the present embodiment, the transfer unit 5 has a transfer drum 5a, a transfer brush charger 5b as transfer means, an attraction brush charger 5c for electrostatically attracting a print sheet and an attraction roller 5g opposite to attraction brush charger 5c, an inner charger 5d, an outer charger 5e and a transfer removal sensor 5m. Further, a cylindrical shaped print-sheet holding sheet 5f of dielectric material such as polycarbonate is integrally formed around an opening of circumferential surface of the transfer drum 5a rotatably supported at its shaft.

The controller 200 supplies a print sheet in a print-sheet cassette 7 via a conveyance system and the transfer unit 5 to a position opposite to the electrostatic drum 1 at predetermined timing, and holds the print sheet on the print-sheet holding sheet 5f by electrostatic attraction. Then, the toner images formed on the electrostatic drum 1 are transferred onto the print sheet on the print-sheet holding sheet 5f in accordance with the rotation of the transfer drum 5a.

When the transfer of the toner images from the original image onto the print sheet has been completed, the controller 200 operates a separation claw 8a, a separation push rod 8b and a separation charger 5h to separate the print sheet from the transfer drum 5a, then fixes the toner images onto the print sheet by a heat roller fixing unit 9, and discharges the print sheet into a tray 10.

Further, after the transfer of the toner image, the controller 200 cleans residual toner on the surface of the electrostatic drum 1 by using a cleaning unit 6 comprising a cleaning blade 6a and a rake sheet, in preparation for the next image formation processing. Further, to prevent disperse-attachment of powder to the print-sheet holding sheet 5f of the transfer drum 5a and attachment of oil to a print sheet, the controller 200 performs cleaning by using a fur brush 14 and a backup brush 15 opposite to the fur brush 14 via the print-sheet holding sheet 5f. The cleaning is performed before or after image formation, and is performed upon occurrence of paper jam.

Next, the pulse width modulation performed by the PWM 212 will be described.

Figure 4:
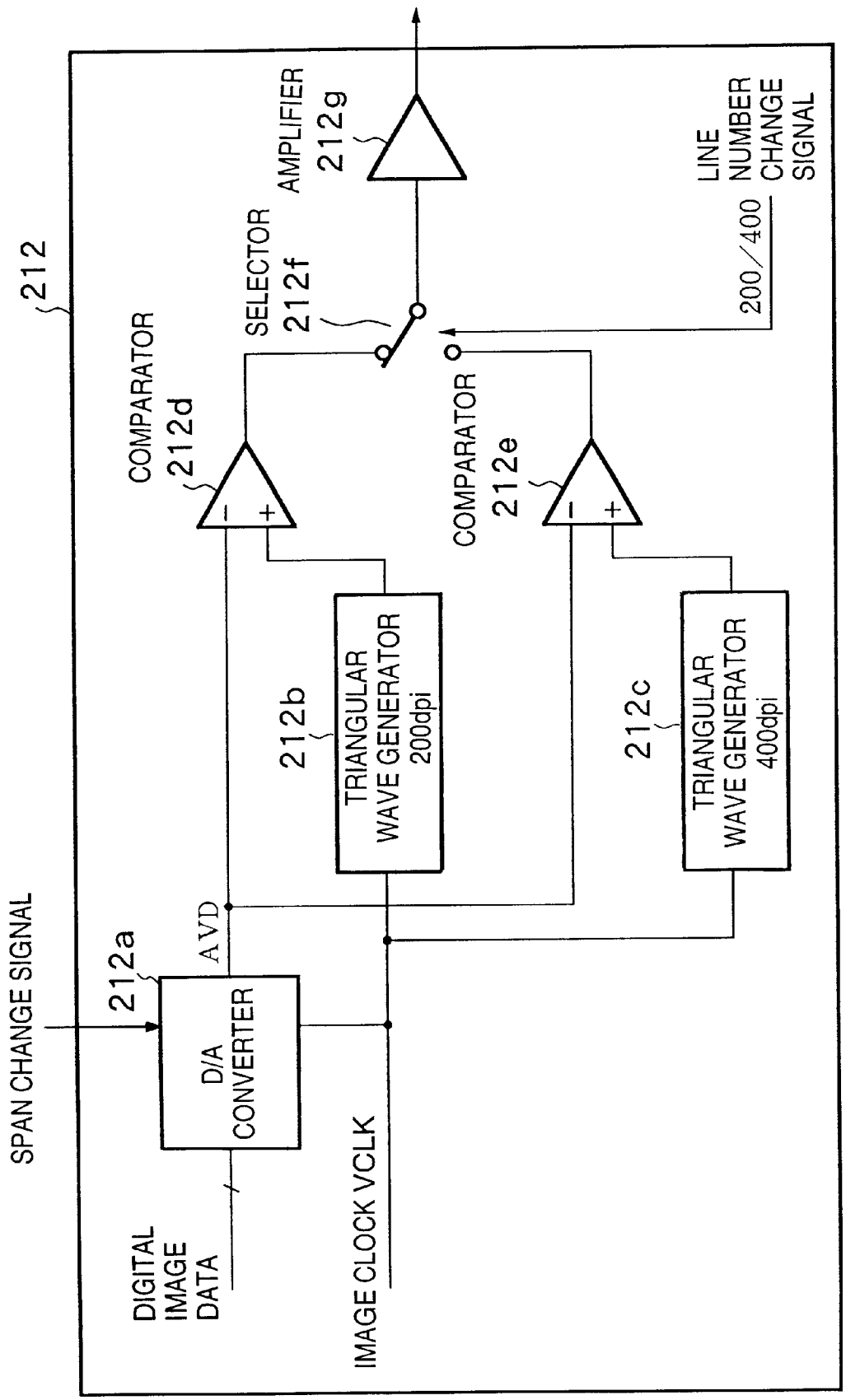
FIG. 4 is a block diagram showing the schematic construction of a PWM 212 according to the first embodiment.
Figure 5:
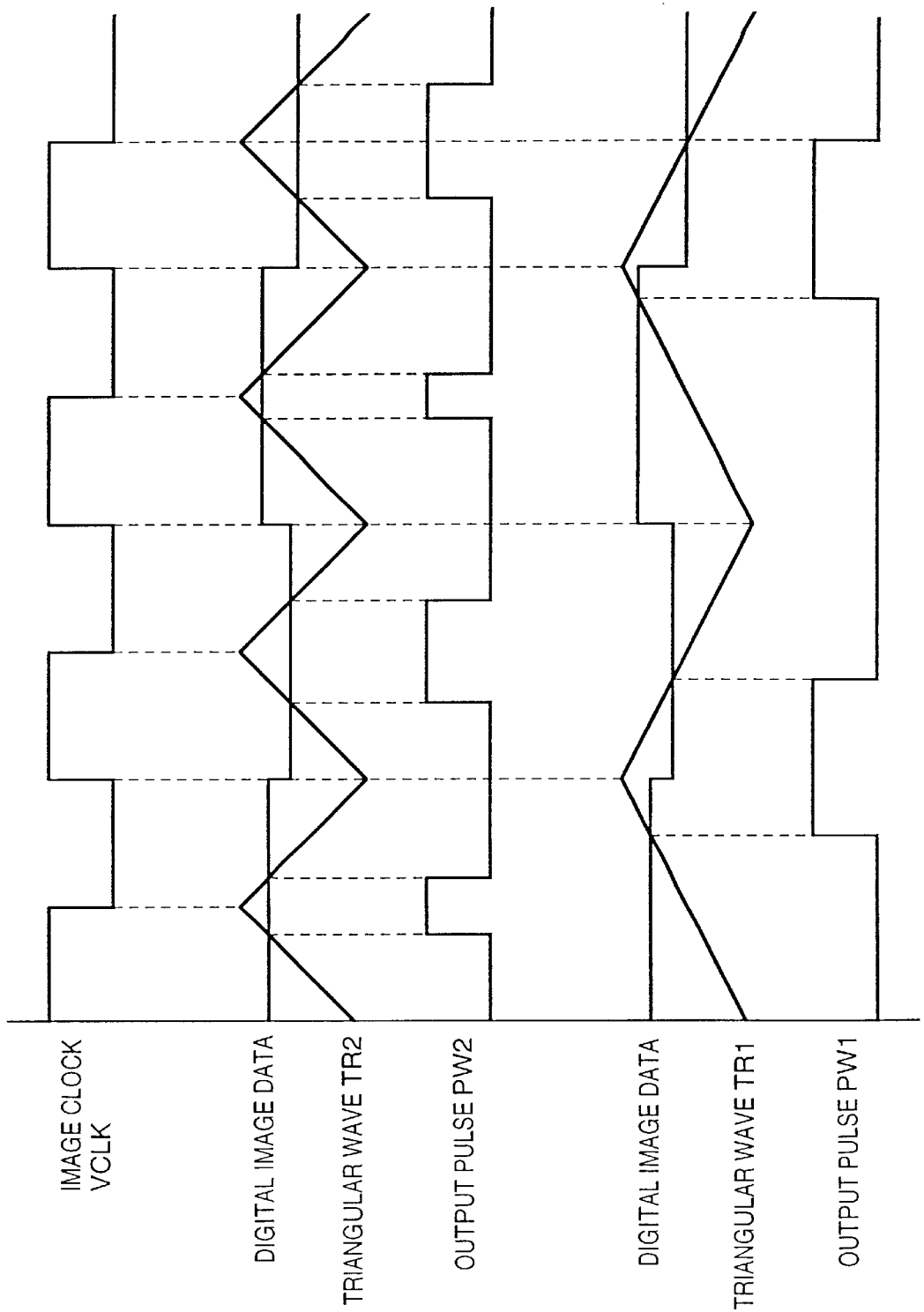
FIG. 5 is a timing chart showing main signal waves in the PWM 212 according to the first embodiment.

FIG. 4 is a block diagram showing the construction of the PWM 212 as the first embodiment of the present invention. FIG. 5 is a timing chart showing main signal waves in the PWM 212 according to the first embodiment.

In FIG. 4, digital image data outputted from the LUT 211 is converted by the D/A converter 212a into an analog voltage, thus becomes an analog video signal AVD. At this time, the D/A converter 212a generates a minimum voltage if the value of the digital image data is "00h" (h: a hexadecimal number), while generates a maximum voltage if the value of the digital image data is "FFh". The analog video signal AVD is inputted into negative inputs of comparators 212d and 212e. Further, the D/A converter 212a has an amplifier for regulation of the span of the analog video signal AVD to be outputted. The controller 200 (CPU 214) sets a span change signal in the D/A converter 212a in accordance with the density setting of an output image made by an operator from an operation panel (not shown). In accordance with the span change signal, the amplifier in the D/A converter 212a changes the span of the analog video signal AVD.

An output TR1 from a triangular wave generator 212b and an output TR2 from a triangular wave generator 212c are inputted into positive inputs of the comparators 212d and 212e.

Next, the comparators 212d and 212e compare the voltage level of the analog video signal AVD with the voltage levels of the triangular signals TR1 and TR2, and obtain output pulses PW1 and PW2. At this time, the number of lines represented by the output pulses PW1 and PW2 are 200 lines/inch (image) and 400 lines/inch (image).

Figure 6:
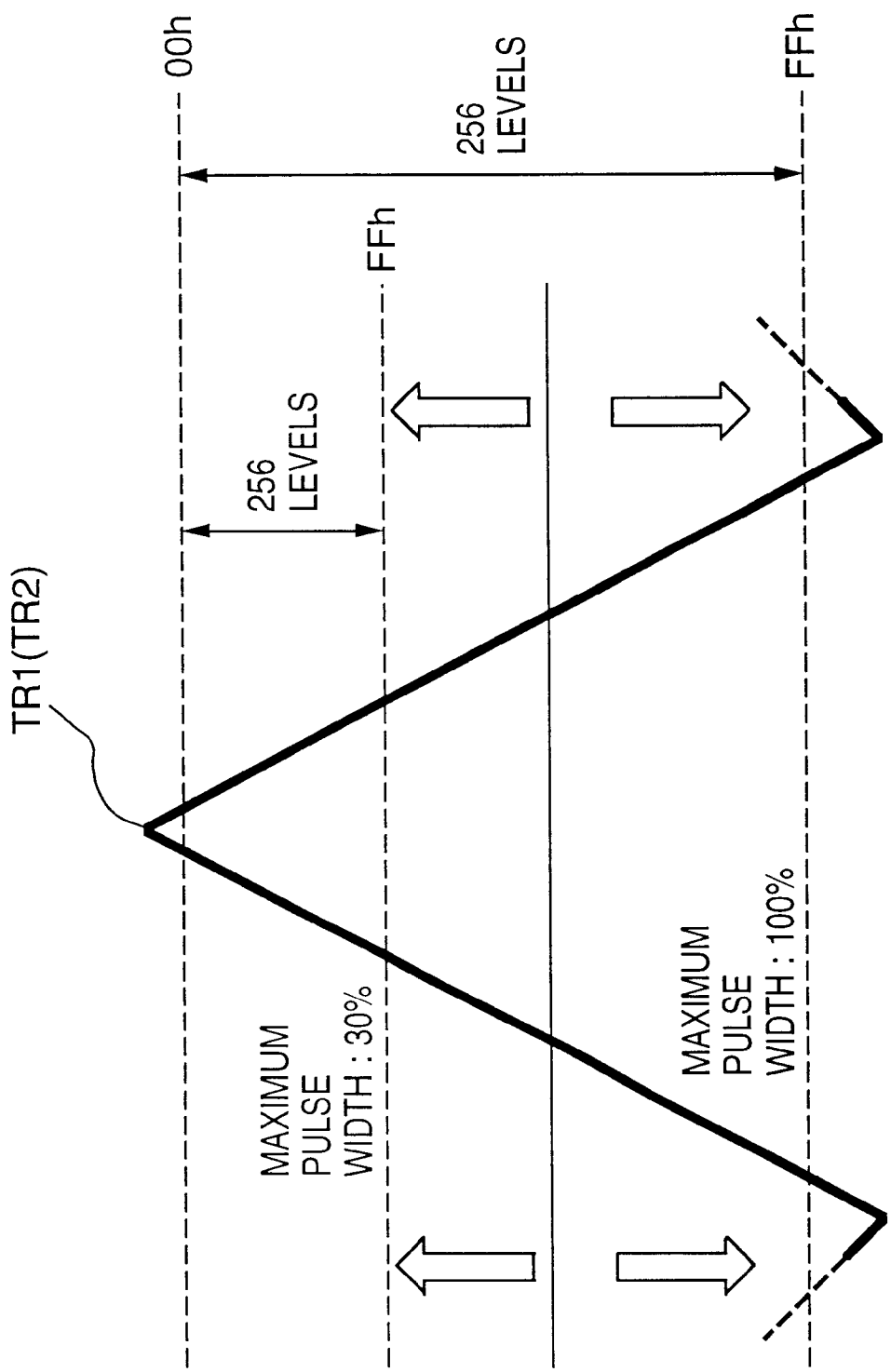
FIG. 6 is an explanatory view showing a method for changing the maximum pulse width of a signal outputted by the PWM 212 according to the first embodiment.

FIG. 6 is an explanatory view showing a method for changing the maximum pulse width outputted by the PWM 212 according to the first embodiment. In the present embodiment, as shown in FIG. 6, the level of the analog video signal AVD representing FFh digital image data is varied, as shown in FIG. 6, by changing the span of the analog video signal AVD by the above-described span change signal. By this change, the maximum pulse width of the output pulse PW1 (PW2) obtained from comparison between the analog video signal AVD and the triangular wave TR1 (TR2) by the comparator 212d (212e) can be changed within the range from 30% to 100% (when the value of the image data is "FFh", the maximum pulse width is regarded as 100%). In accordance with the change of maximum pulse width, the laser light E outputted by the laser driver 41 can be changed. As a result, the density of an image outputted by the printer can be changed. Note that in the range (30% to 100%) of maximum pulse width, in any case, 256-level image data is represented by full span of the analog video signal AVD.

The output pulses PW1 and PW2 are inputted into a selector 212f, and selected in accordance with a line number change signal for 200/400 dpi selection, outputted from the CPU 214. In the present embodiment, the number of lines indicated by the line number change signal is changed by the operator's operation from the operation panel (not shown). For example, in a character mode, the operator selects 400 dpi, and in a photographic mode, the operator selects 200 dpi. Note that in a fourth embodiment to be described later, the number of lines is changed by the CPU 214 in accordance with the control signal SEN from the black character detector 220.

The output pulse selected at the selector 212f is level-amplified by an amplifier 212g, and outputted as a laser drive pulse to the laser driver 41. The printer reproduces the tonality of the image to be printed in accordance with the pulse width of the laser driver pulse.

Next, to explain the developing characteristic of the electrostatic drum 1 of the present digital copying machine, the contrast potential of the electrostatic drum 1 will be described.

Figure 7:
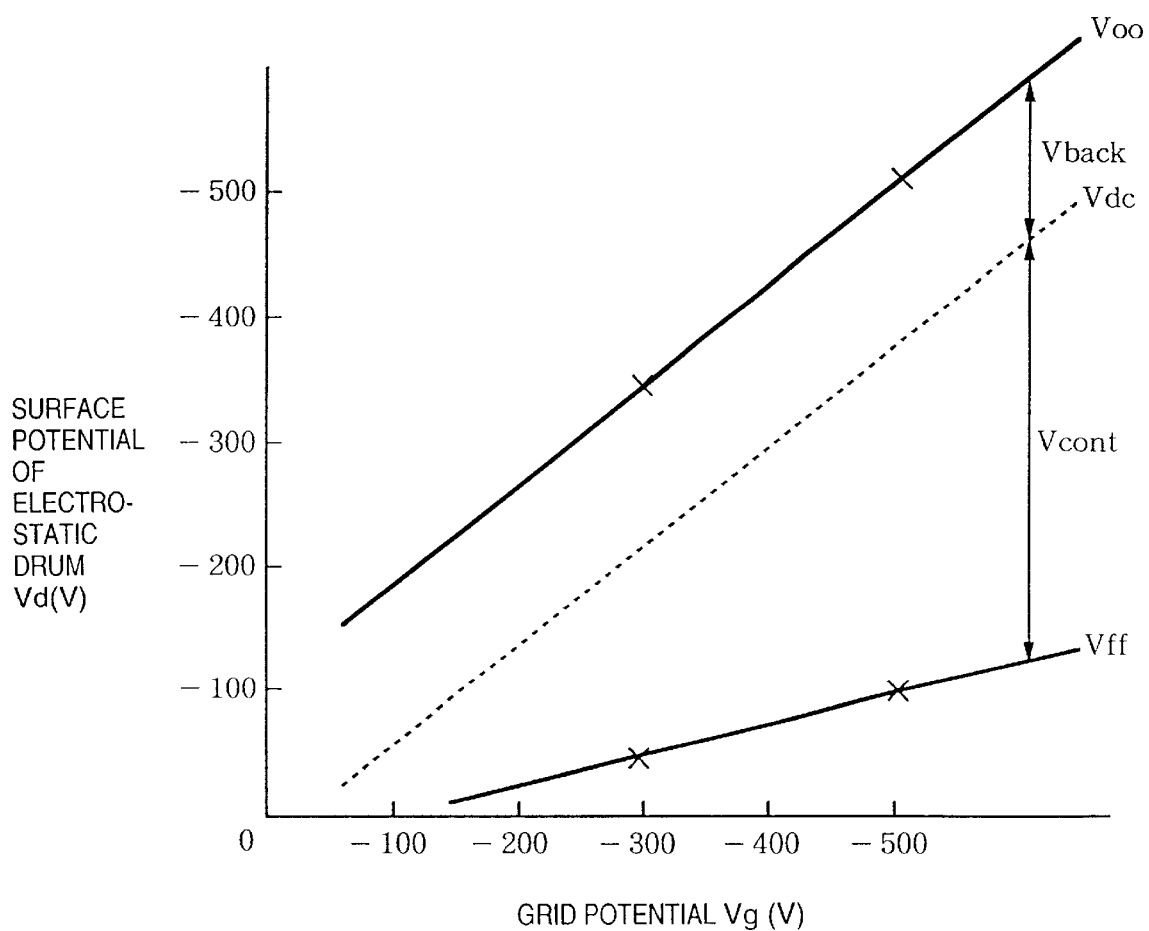
FIG. 7 is a graph showing the relation between the surface potential of an electrostatic drum and a grid potential in the digital copying machine as the first embodiment.

FIG. 7 is a graph showing the relation between the surface potential of an electrostatic drum 1 and a grid potential in the digital copying machine according to the first embodiment. In FIG. 7, a lateral axis represents a potential Vg of a grid (not shown in FIG. 1) of the primary charger 2, and a vertical axis, a surface potential Vd of the electrostatic drum 1.

In FIG. 7, "Voo" is a surface potential of the electrostatic drum 1 after irradiated by the laser light E outputted from the laser driver 41 when the level of the output pulse from the PWM 212 is "00h", at the respective values of the grid potential Vg. Further, "Vff" is a surface potential of the electrostatic drum 1 irradiated by the laser light E outputted from the laser driver 41 when the level of the output pulse from the PWM 212 is "FFh", at the respective values of the grid potential Vg. "Vdc" is a developing bias potential.

The developing characteristic of the electrostatic drum 1 is as described the above. The contrast potential is a value obtained by adding a potential Vcont, which is between the surface potential Vff and the developing bias potential Vdc, to a potential Vback which is between the surface potential Voo and the developing bias potential Vdc. Accordingly, in the electrostatic drum 1 in the present digital copying machine, as the potential Vcont is higher, an electrostatic latent image can be easily developed. This increases the maximum density of the toner image.

Note that if the potential Vback becomes 70 V or lower, a phenomenon that excessive toner is attached to the surface of the electrostatic drum (hereinafter referred to as a "fog phenomenon") occurs. Further, if the potential Vback becomes 180 V or higher, a phenomenon that carrier is attached to the electrostatic drum occurs. In the present embodiment, the potential Vback is maintained around 150 V regardless of the change of the grid potential Vg (this control will be described in detail later).

Figure 8:
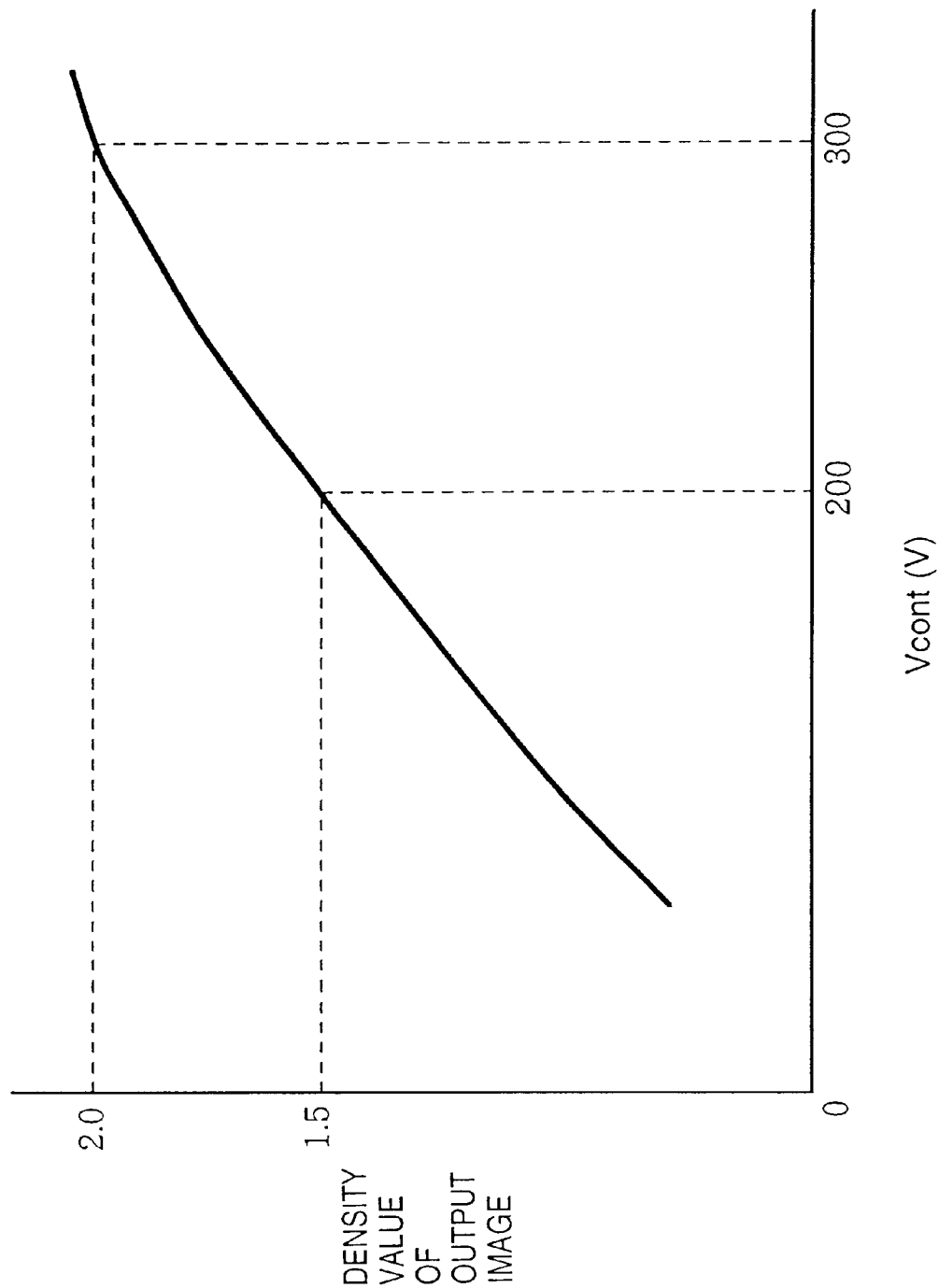
FIG. 8 is a graph showing the relation between a potential Vcont and a maximum density value of an output image reproducible by a printer, according to the first embodiment.

The potential Vcont is set by the control of the grid potential Vg by the controller 200 and the surface potential Vd of the electrostatic drum 1. FIG. 8 shows the maximum density of an output image reproducible by the printer when this control is performed.

FIG. 8 is a graph showing the relation between the potential Vcont and the maximum density value of an output image reproducible by the printer, according to the first embodiment.

In FIG. 8, the curve P represents the characteristic of the maximum density value of the output image obtained by image formation by the printer when the maximum pulse width is set to 100% by the above-described span change signal. For example, when the controller 200 sets the potential Vcont of the printer to 200 V, the maximum density value of an output image obtained by image formation is "1.5". If the controller 200 sets the potential Vcont to 300 V, the maximum density value is "2.0".

In the present embodiment, to set the maximum density value of an output image which can be physically outputted by the printer to "2.0", the potential Vcont is set to 300 V. Then, the maximum pulse width is controlled within the range from 30% (the curve Q in FIG. 8) to 100% (the curve P in FIG. 8) by the span change signal, and in accordance with the control status, the maximum density value of the output image is varied within the range of "2.0".

Next, description will be made about a case where in a general electrophotographic printer, the potential Vcont is set to 200 V, and the maximum density value of an obtained output image is "1.5".

Figure 9:
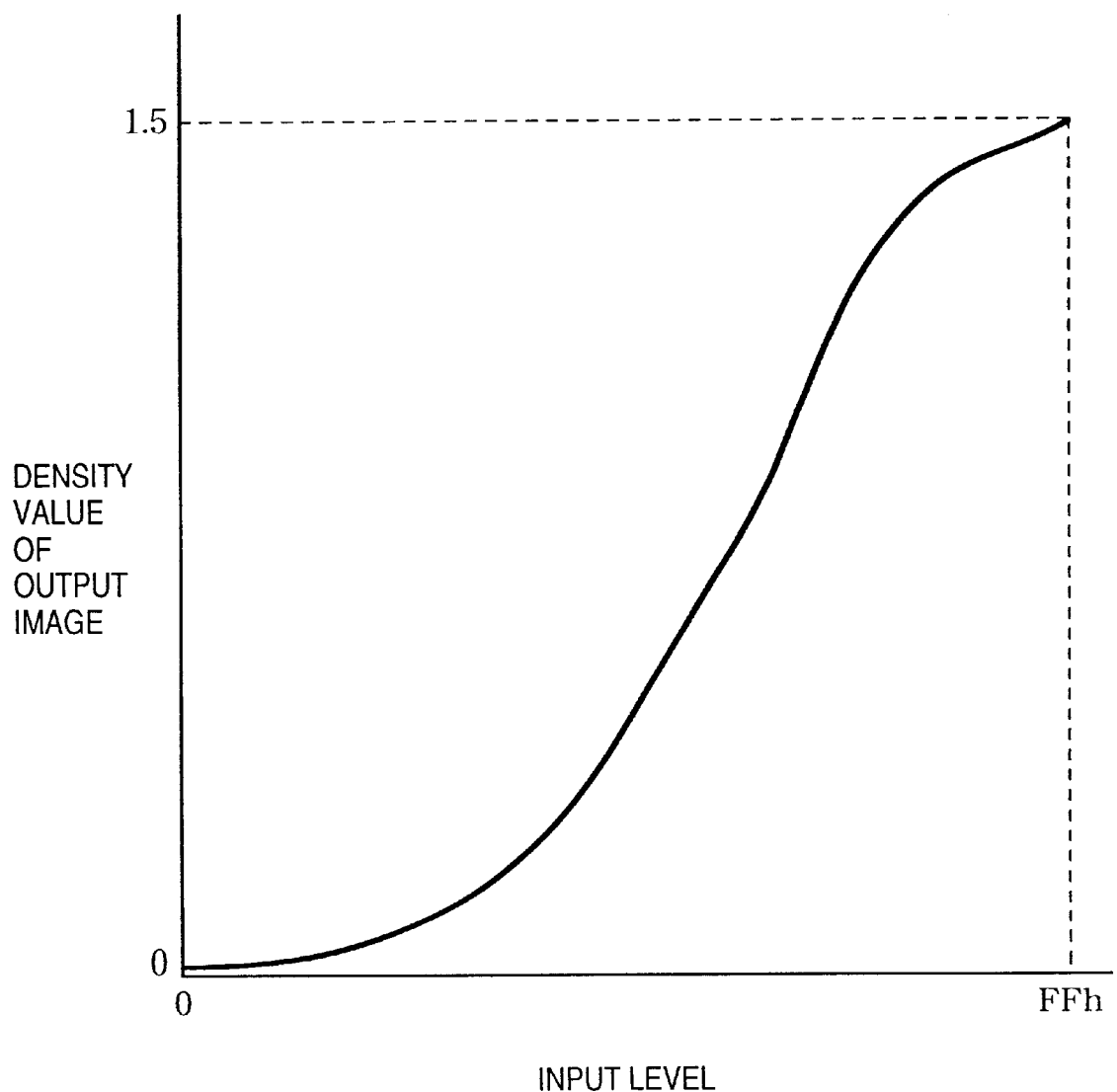
FIG. 9 is a graph showing a printing characteristic of a general electrophotographic printer.
Figure 10:
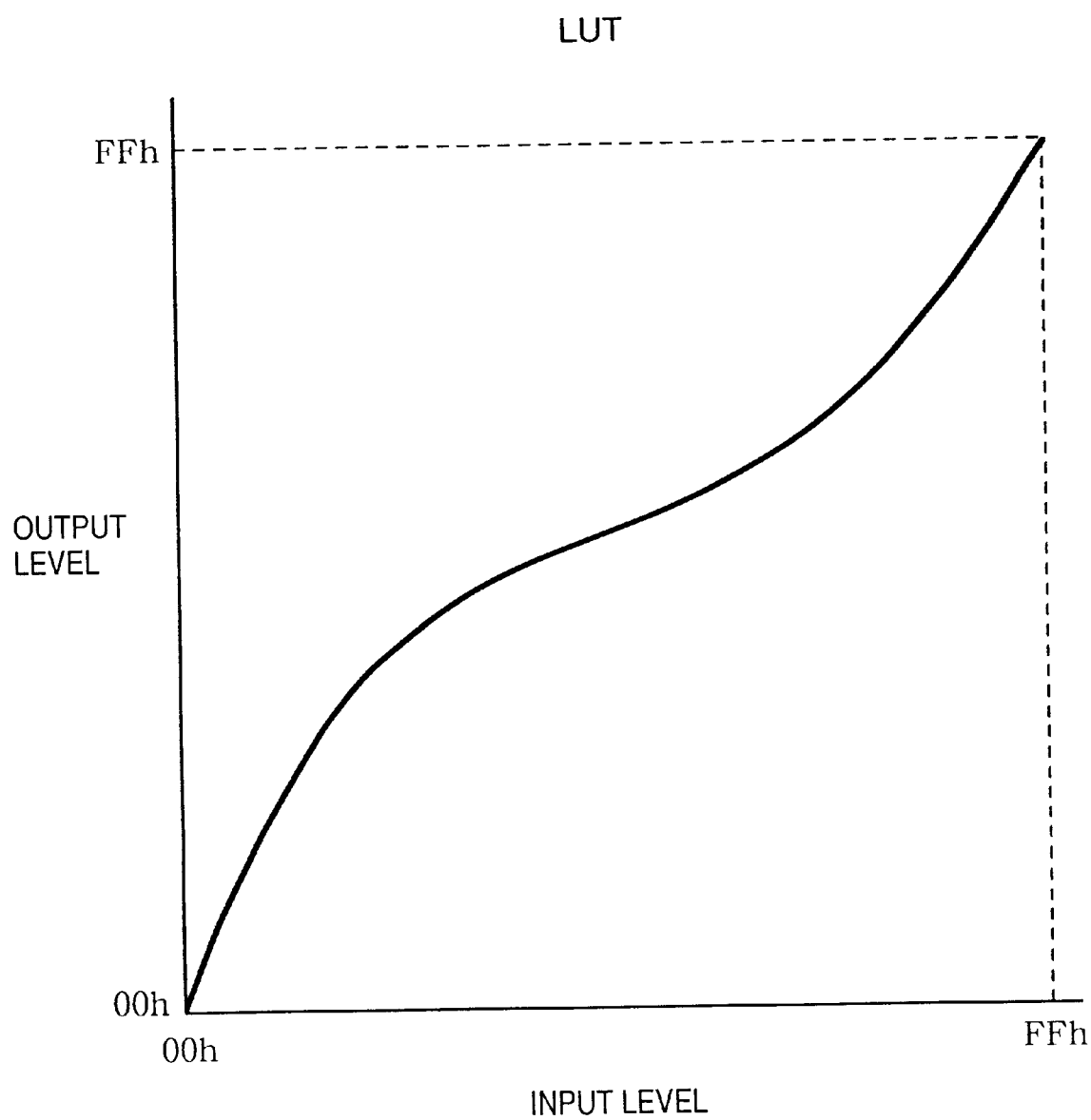
FIG. 10 is a graph showing a general LUT for a printer having the printing characteristic in FIG. 9.
Figure 11:
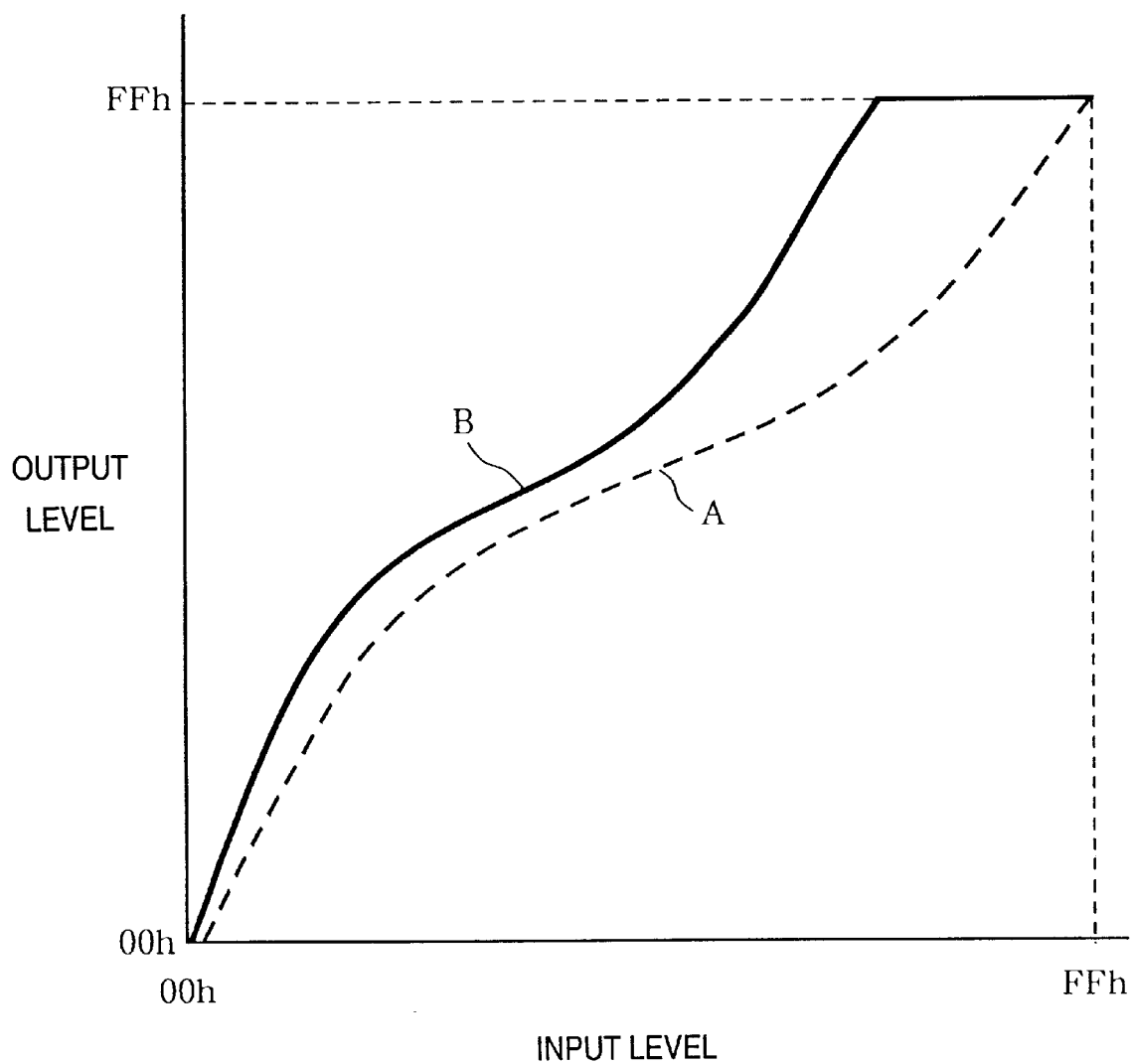
FIG. 11 is a graph showing a general LUT for printing in high density by the printer having the printing characteristic in FIG. 9.

FIG. 9 is a graph showing a printing characteristic of a general electrophotographic printer. When the input level of image data is "FFh", the density value of an output image is "1.5". Further, FIG. 10 is a graph showing a general LUT for a printer having the printing characteristic in FIG. 9. The curve in this figure shows the characteristic of a general LUT to control the density of an output image to correspond to that of an original image. Further, FIG. 11 shows a general LUT for high-density printing by the printer having the printing characteristic in FIG. 9 and the LUT in FIG. 10. In FIG. 11, alphabet A denotes the characteristic curve shown in FIG. 10; B, a characteristic curve used for high-density printing. In this manner, generally, the density of an output image is changed by preparing a plurality of LUT characteristic curves as shown in FIG. 11, and selecting one of the characteristic curves. However, when an image is printed by this printer by using the characteristic curve in FIG. 11, if an original has a predetermined density value, the density value of an output image becomes "1.5", i.e., the maximum density value of the printer, and the density value does not become higher than this value.

On the other hand, in the present embodiment, as the potential Vcont is set to 300 V and the maximum pulse width is controlled by the span change signal, the maximum density value of an output image can be varied in accordance with the control status. Accordingly, the characteristic data set in the LUT 212 has a general characteristic curve as shown in FIG. 10.

Figure 12:
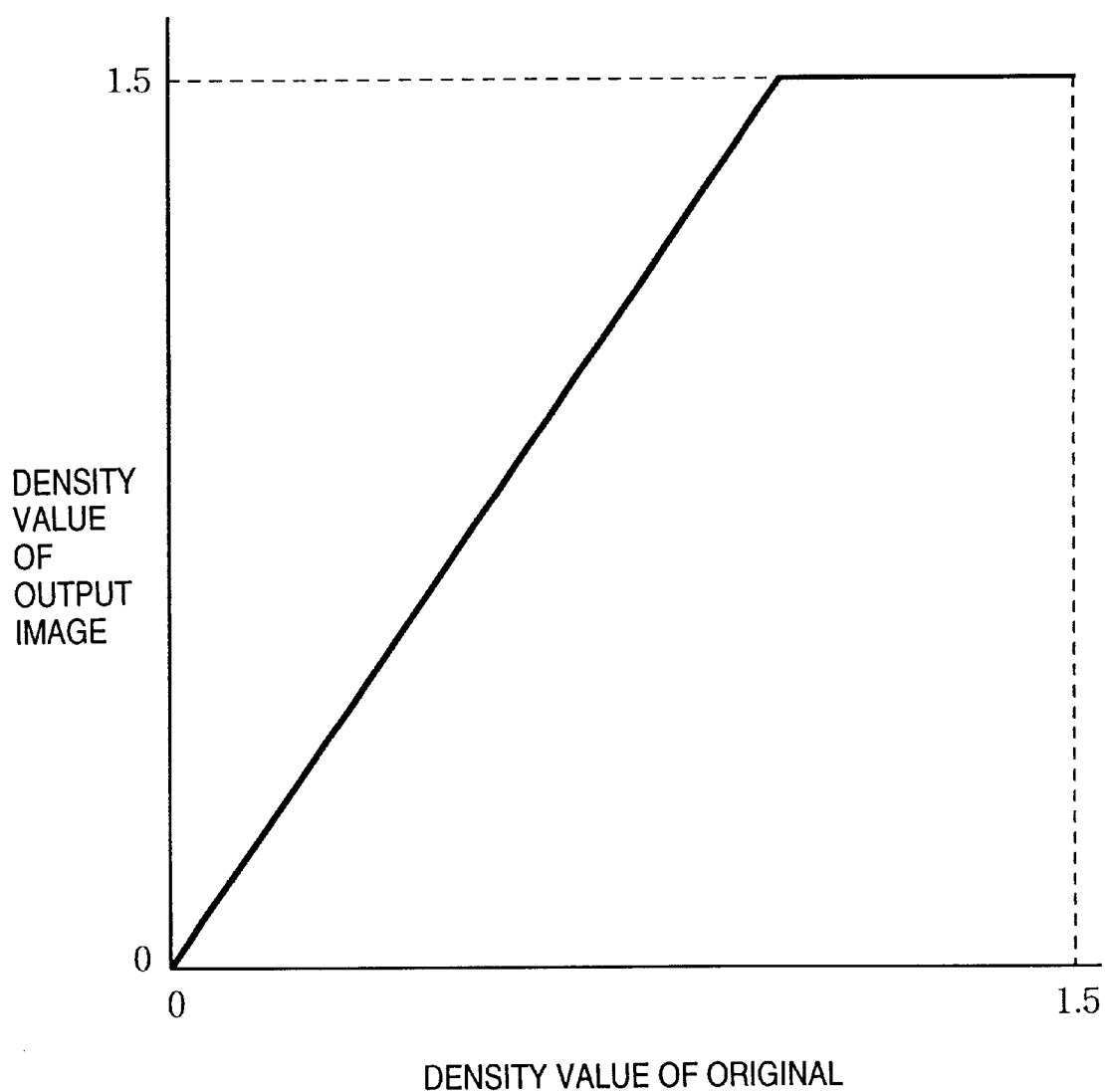
FIG. 12 is a graph showing the relation between the density of an original and that of an output image when the LUT in FIG. 11 is used.
Figure 13:
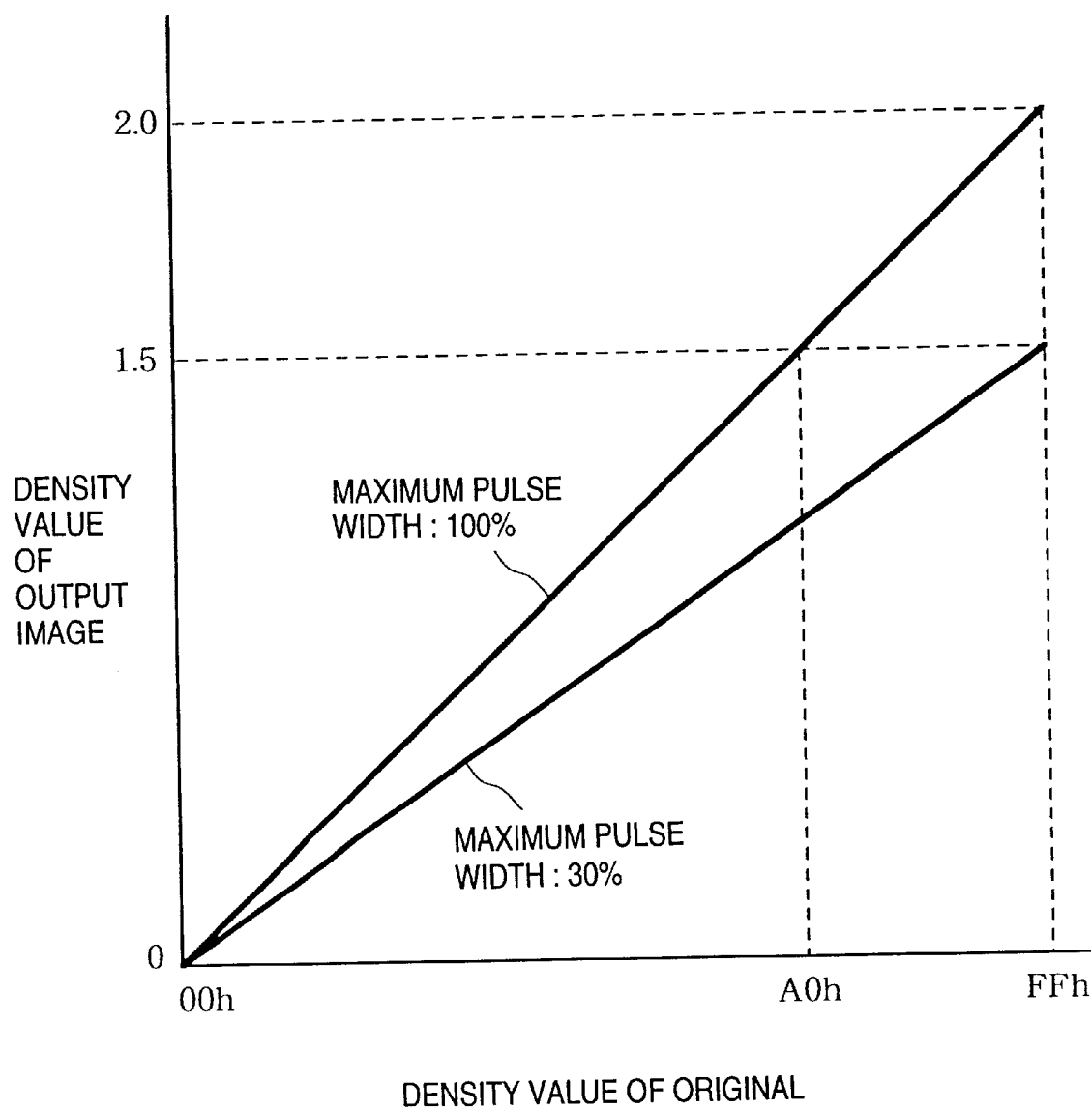
FIG. 13 is a graph showing a density characteristic of an output image with respect to the density level of an original, according to the first embodiment.

FIG. 13 is a graph showing a density characteristic of an output image with respect to the density level of an original, according to the first embodiment. In the present embodiment, as the LUT having the general characteristic as shown in FIG. 10 is used, the density characteristic of an output image by the present digital copying machine with respect to the density of an original can be approximately linear with any maximum pulse width set by the span change signal as shown in FIG. 13. This prevents a problem that the density of an output image does not change with respect to the change of density of an original, as described with reference to FIG. 12, and the maximum density of the output image does not change from a predetermined value. Further, as a 256-level image can be formed with any maximum pulse width within the range from 30% to 100%, degradation of the tonality of output image can be prevented.

Note that in the above description, the density value which can be outputted by the printer at a contrast potential is the same value for any of M, C, Y and K color components, for convenience of explanation. Actually, the color characteristics of M, C, Y and K toner are different, therefore, if the output settings of the printer for the respective colors are the same, the printable maximum density values for the respective colors are different. For this reason, when the M, C, Y and M image signals are frame-sequentially pulse-width modulated by the PWM 212, the analog image signals outputted from the D/A converter 212a are corrected in accordance with correction coefficients pre-set in the ROM 213 or the like. By this arrangement, as the maximum pulse width can be changed for each color component, only the reproducible maximum density value is controlled.

Figure 14:
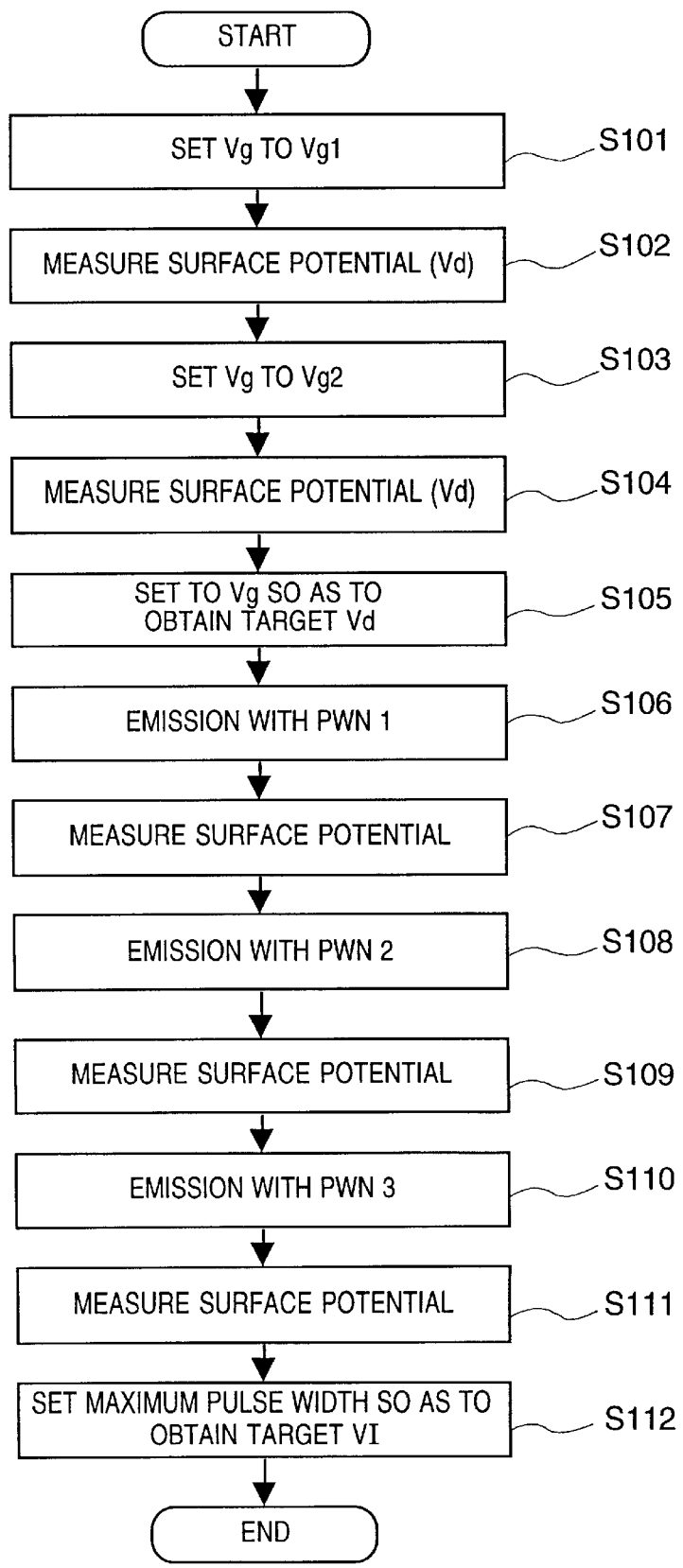
FIG. 14 is a flowchart showing the flow of potential control according to the present invention.

Next, a method for controlling the potentials for M, C, Y and K image signals and a method for setting maximum pulse widths will be described in detail with reference to FIG. 14.

In the present embodiment, upon exposure with the minimum semiconductor laser emission level, the surface potential Vd of the electrostatic drum 1 and the developing bias Vdc are maintained approximately constant with respect to all the colors (yellow, magenta, cyan and black) of toner used in image printing. More specifically, a target potential of the surface potential Vd is 7000 V, and the developing bias Vdc is set to –550 V so as to set the potential Vback about 150 V (e.g., 70 V to 180 V) to prevent occurrence of the above-described fog phenomenon or carrier attachment.

Next, a more specific procedure executed by the CPU 214 of the controller 200 will be described in accordance with the flowchart shown in FIG. 14.

First, the grid potential Vg is set to Vg1 (=–600 V) (S101), and the surface potential Vd of the electrostatic drum 1 scanned when the emission pulse level of the semiconductor laser 42 is lowered to a minimum level is measured by the surface potential sensor 12 (S102). Similarly, the grid potential Vg is set to Vg2 (=–800 V) (S103), and the surface potential Vd of the electrostatic drum 1 scanned when the emission pulse level of the semiconductor laser 42 is lowered to a minimum level is measured by the surface potential sensor 12 (S104).

Figure 15:
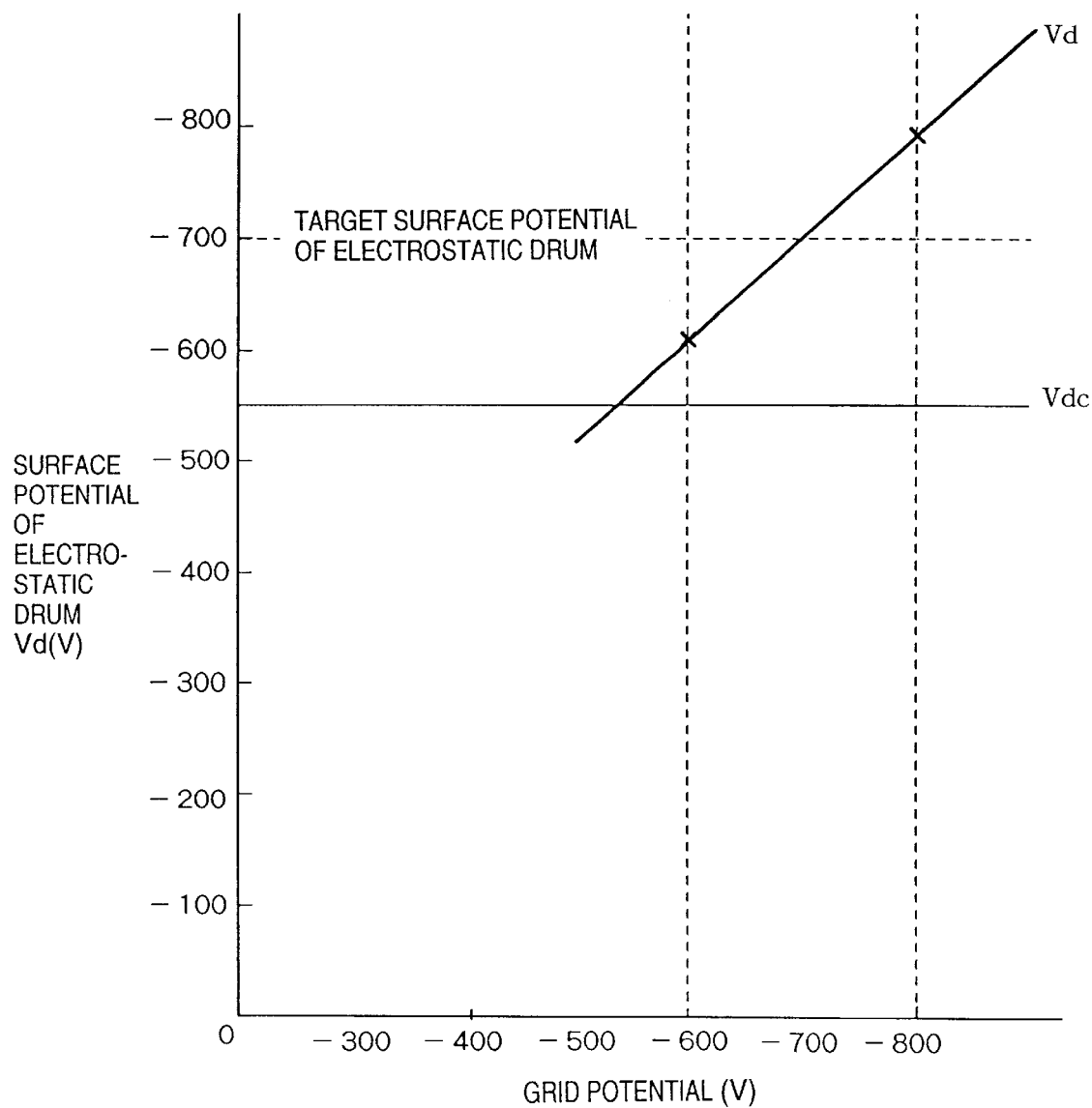
FIG. 15 is a graph explaining processing for determining surface potential Vd according to the present invention.

Next, a grid potential Vg to setting the potential Vd to the target potential –700 V is determined and the grid potential Vg is set to the value (S105). More specifically, the relation between the grid potential Vg and the surface potential Vd is obtained by general extrapolation based on the potential Vd when the grid potential Vg is –600 V and the potential Vd when the grid potential Vg is –800 V. FIG. 15 shows the relation between the grid potential Vg and the surface potential Vd obtained as above. In the example shown in FIG. 15, to set the potential Vd to the target potential –700 V, the grid potential Vg is set to –700 V for all the toner colors.

Figure 16:
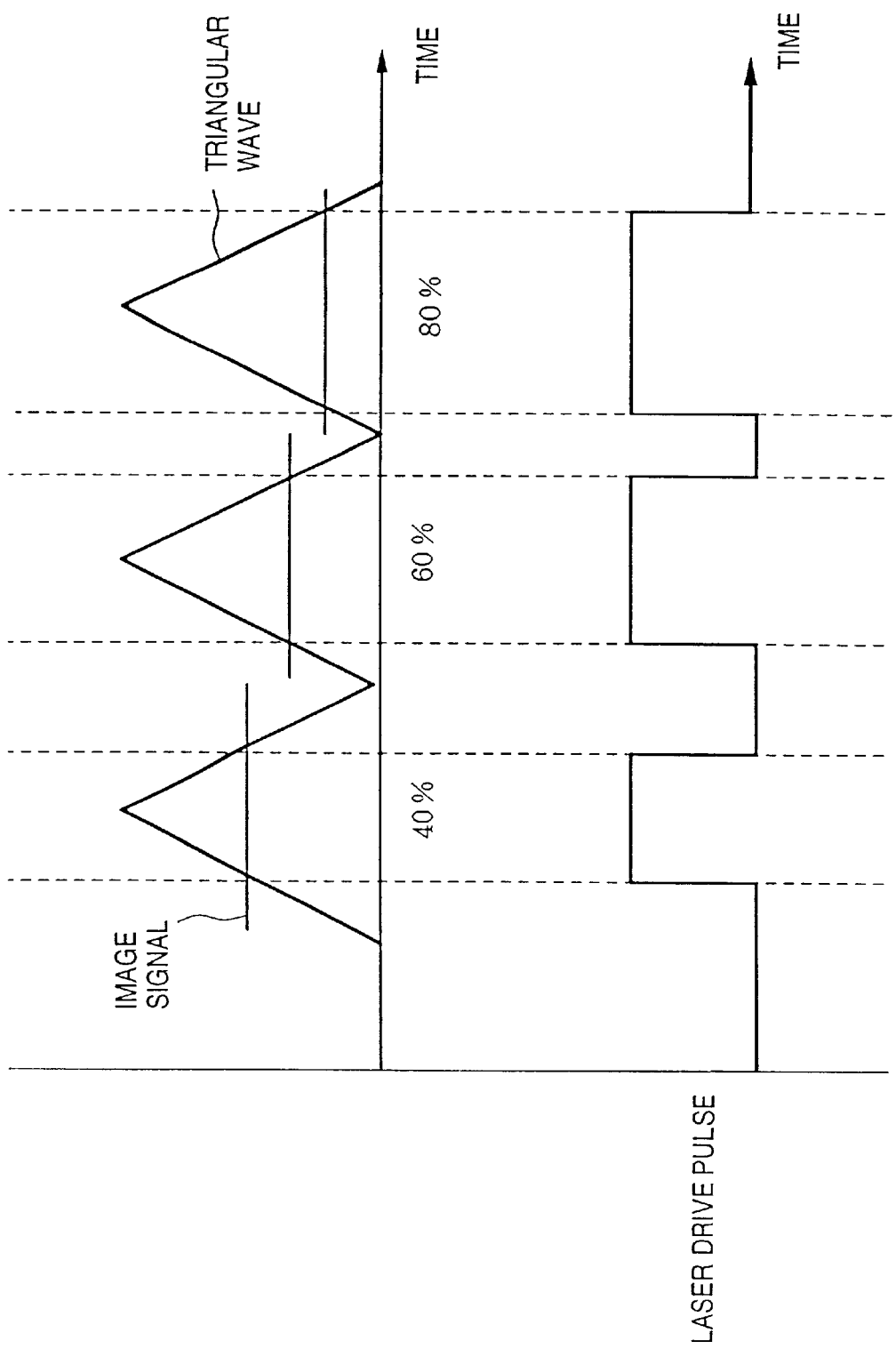
FIG. 16 is an explanatory view showing pulse width modulation by the potential control in FIG. 14.

Next, as shown in FIG. 16, the pulse width of a pulse signal to be supplied to the laser driver 41 is set to 40% of the maximum pulse width (one period of the triangular wave in FIG. 16), and the electrostatic drum 1 is scanned by laser light emitted from the semiconductor laser 42 driven with the pulse width setting (S106). Then, the surface potential of the electrostatic drum 1 is measured by the surface potential sensor 12 (S107). Similarly, as shown in FIG. 16, the pulse width of a pulse signal to be supplied to the laser driver 41 is set to 60% of the maximum pulse width, and the electrostatic drum 1 is scanned by laser light emitted from the semiconductor laser 42 driven with the pulse width setting (S108). Then, the surface potential of the electrostatic drum 1 is measured by the surface potential sensor 12 (S109). Similarly, as shown in FIG. 16, the pulse width of a pulse signal to be supplied to the laser driver 41 is set to 80% of the maximum pulse width, and the electrostatic drum 1 is scanned by laser light emitted from the semiconductor laser 42 driven with the pulse width setting (S110). Then, the surface potential of the electrostatic drum 1 is measured by the surface potential sensor 12 (S111).

Figure 17:
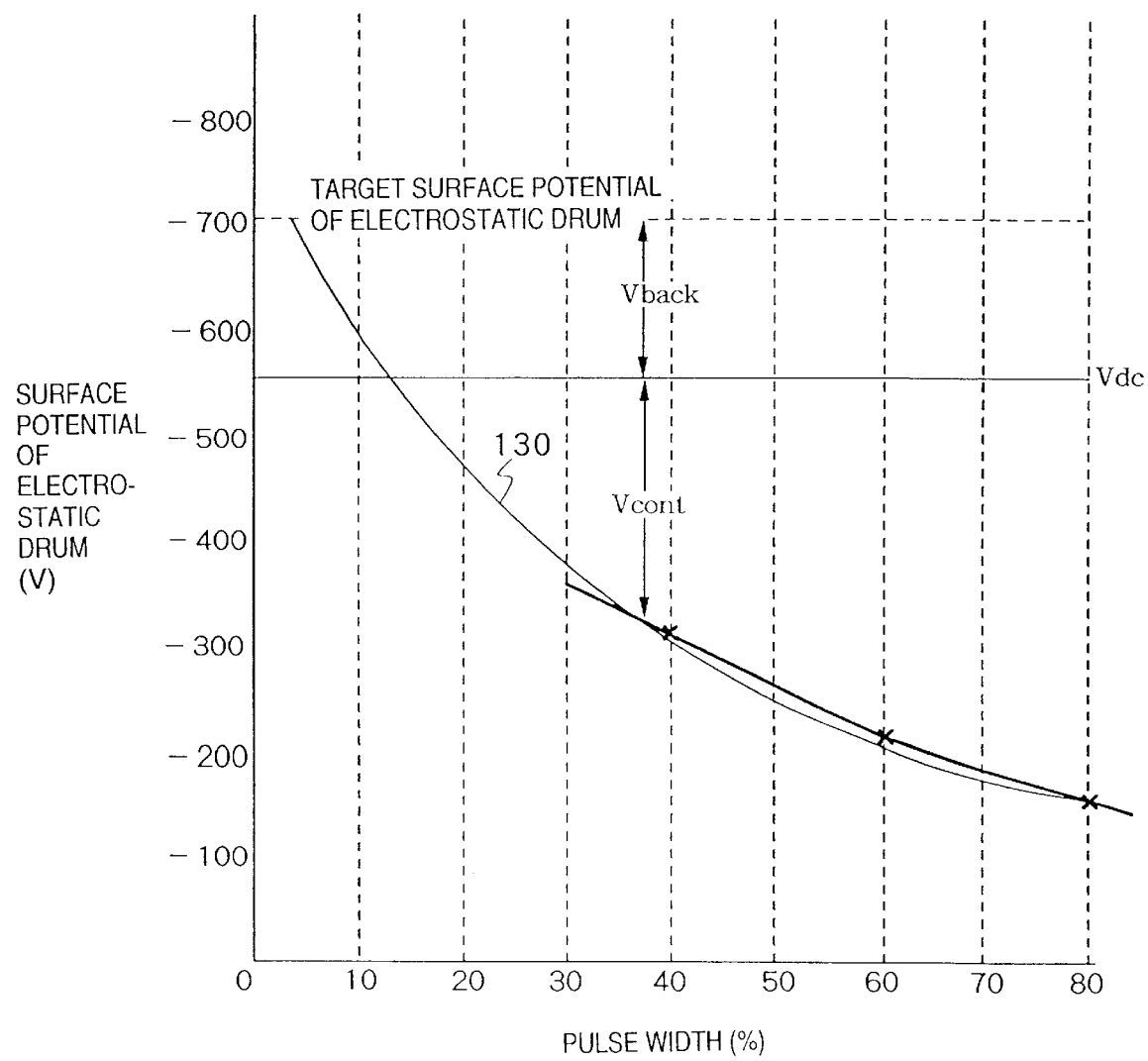
FIG. 17 is a graph showing a pulse width-surface potential curve.

Next, based on data on the surface potential Vd of the electrostatic drum 1 calculated as above, for each toner color, the maximum pulse width of a pulse signal to be supplied to the laser driver 41 is determined in accordance with the environment (in the present embodiment, a water content to be described later is used as a parameter indicative of the environment within the apparatus) (S112). More specifically, the relation between the pulse width and the surface potential Vd of the electrostatic drum 1 is obtained by general extrapolation, based on the data on the surface potential Vd of the electrostatic drum 1 scanned by laser light from laser driver 41 driven with the pulse signals having 40%, 60% and 80% of the maximum pulse width. FIG. 17 shows the relation between the pulse width and the surface potential of the electrostatic drum 1 obtained as above. Hereinbelow, the curve showing the relation will be referred to as a "pulse width-surface potential curve" (130 in FIG. 17).

Table 1 shows the relation between the water content and the contrast potential for magenta.

TABLE 1

| Water Content (g) | 0.86 | 3.03 | 10.52 | 15.22 | 21.56 |
|---|---|---|---|---|---|
| Vcont (V) | –350 | –335 | –280 | –245 | –200 |
| Vback (V) | –130 | –128 | –121 | –116 | –110 |

TABLE 1-continued

| Water Content (g) | 0.86 | 3.03 | 10.52 | 15.22 | 21.56 |
|---|---|---|---|---|---|
| Contrast Potential (V) | −480 | −463 | −401 | −361 | −310 |

The water content is calculated from the temperature and humidity within the apparatus detected by an environmental sensor (not shown) within the apparatus.

TABLE 2

| Color | Yellow | Magenta | Cyan | Black |
|---|---|---|---|---|
| Vcont (V) | −210 | −280 | −250 | −350 |
| vback (V) | −121 | −121 | −121 | −121 |
| Contrast potential (V) | −331 | −401 | −371 | −471 |

Table 2 shows the contrast potentials for the respective colors when the water content is 0.52 g.

For example, as shown in Tables 1 and 2, an appropriate potential Vcont is determined for each color and environment.

Accordingly, a pulse width to set the difference between the surface potential in the pulse width-surface potential curve as shown in FIG. 17 and the developing bias Vdc, i.e., the potential Vcont to a value appropriate to each color and environment, is set as a maximum pulse width. As described above, the environment is measured by the environmental sensor (not shown). Further, in the digital copying machine according to the present embodiment, the minimum pulse width is a predetermined pulse width regardless of color or environment so as to maintain the surface potential Vd and the grid potential Vg approximately constant for all the toner colors.

Figure 18:
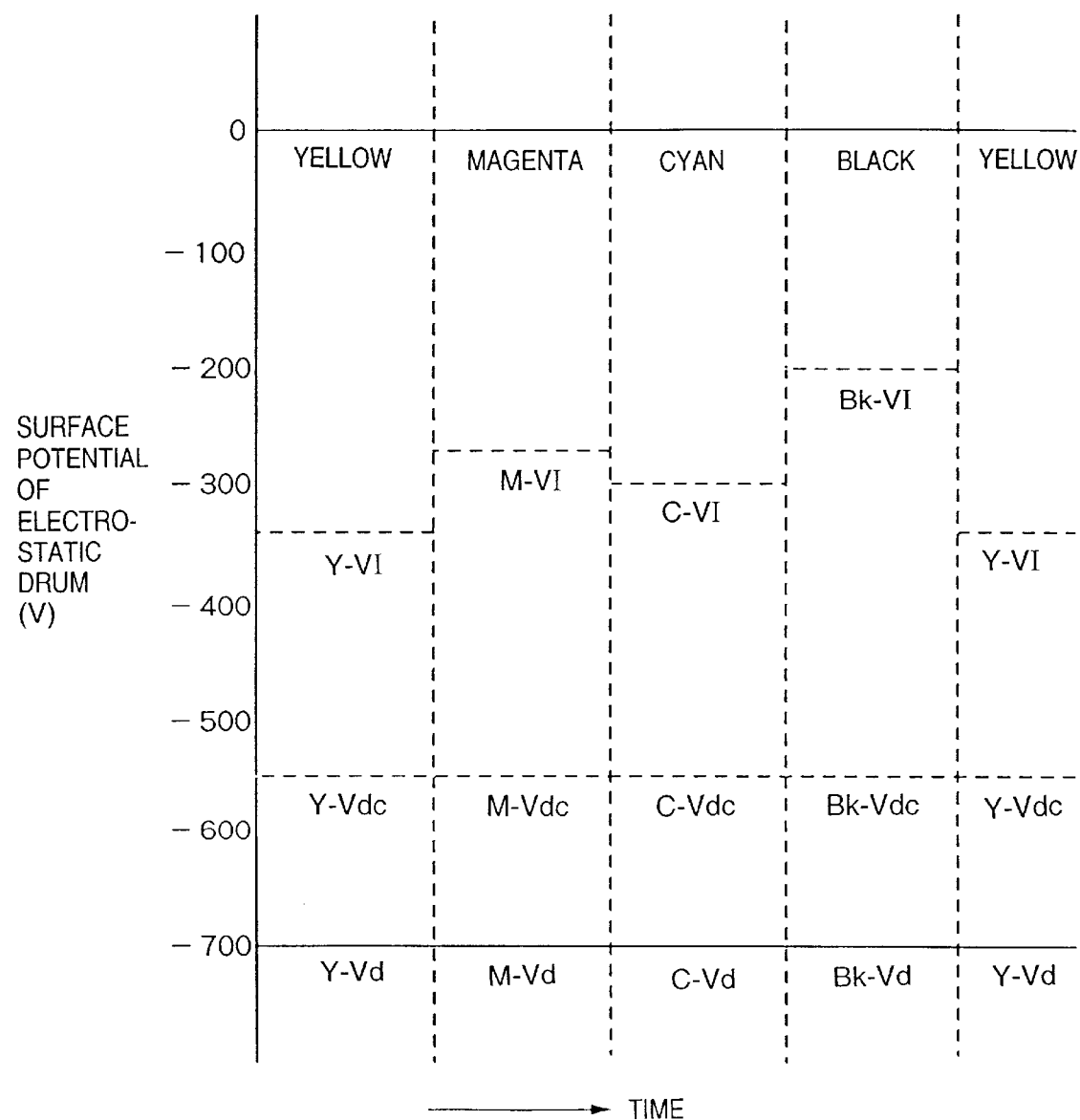
FIG. 18 is a graph showing a latent-image potential and development bias in image formation processing according to the present invention.

FIG. 18 shows the surface potential of the electrostatic drum 1 for the respective colors in specific environment. Note that in FIG. 18, "X-VI" means a potential VI for a color X (=Y, M, C and K); "X-Vdc", the developing bias Vdc for the color X; and "X-Vd", the potential Vd for the color X. The potential VI for each color is controlled by changing the maximum pulse width as described above.

Thus, as the grid potential Vg has a predetermined value and the potential Vd is maintained approximately constant regardless of color, the potential Vback is prevented from exceeding an allowable range (e.g., 70 V to 180 V) upon color change, and the problems such as fog phenomenon and carrier attachment can be prevented.

Note that in the above embodiment, the maximum pulse width is controlled by level-changing the output voltage of the D/A converter 212a, however, this does not pose any limitation on the present invention. For example, the maximum pulse width may be controlled by changing the peak value of the triangular wave.

Figure 19:
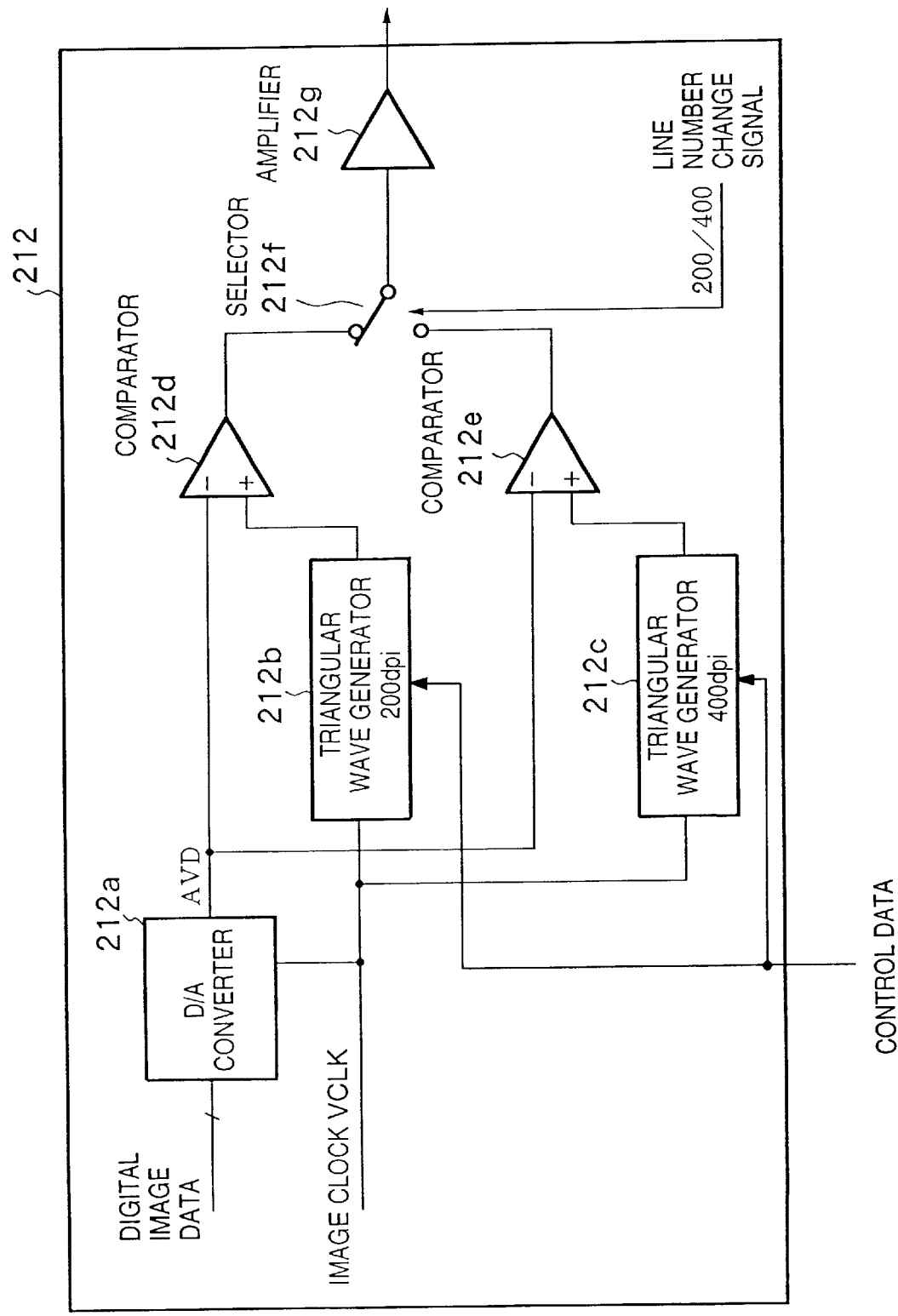
FIG. 19 is a block diagram showing another construction of the PWM 212 according to the present invention.

FIG. 19 is a block diagram showing another construction of the PWM 212 in which the peak value of the triangular wave can be changed.

In FIG. 19, triangular wave generators 212b and 212c input control data to change the peak value of the triangular wave from the controller 200, and change the peak value of the triangular wave based on the control data.

Figure 20:
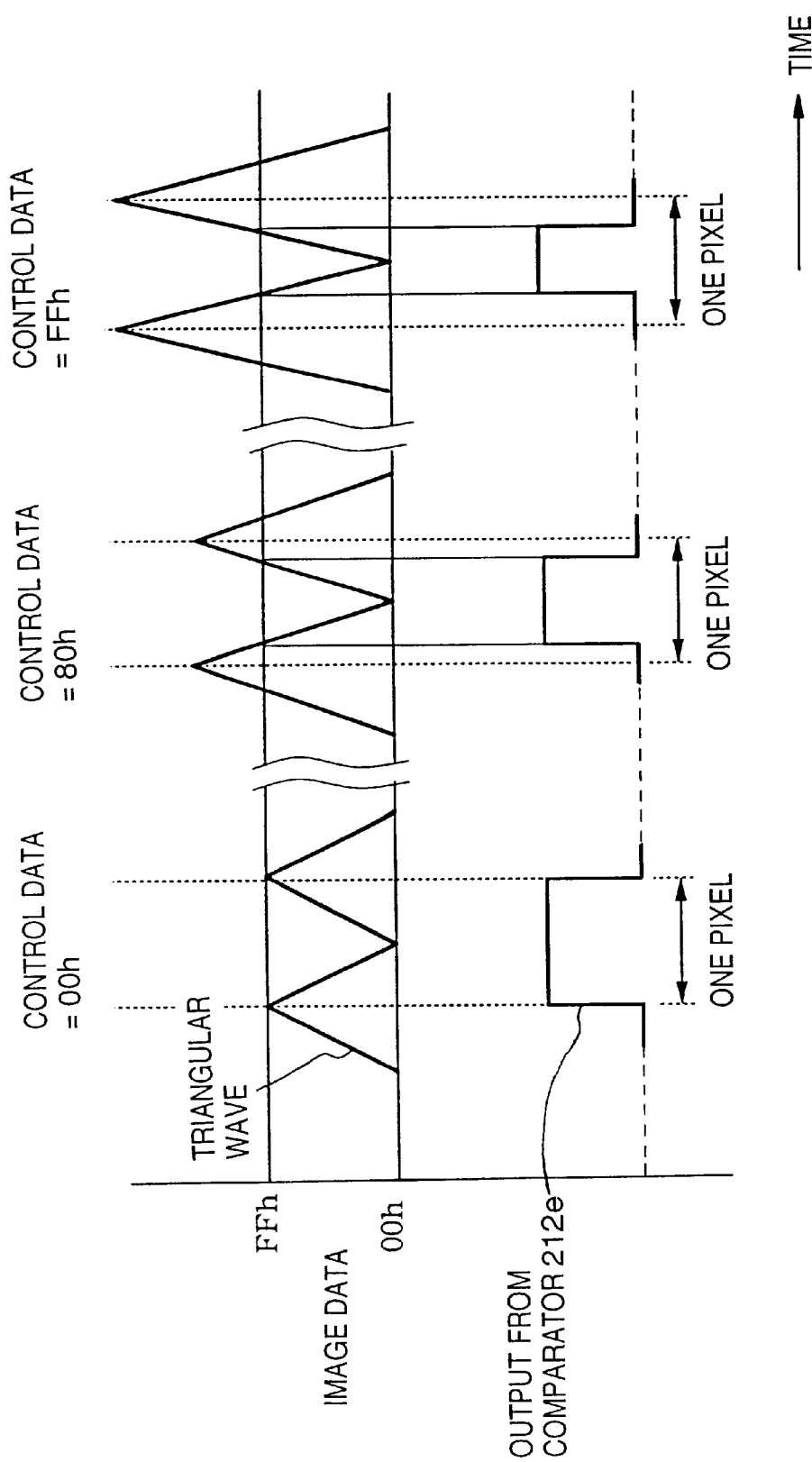
FIG. 20 is an explanatory view showing an example of output from a comparator 212e of the PWM 212 in FIG. 19.

FIG. 20 shows an example of the output from the comparator 212e of the PWM 212 in FIG. 19. In this example, if the value of the control data is "00h", the peak value generated by the triangular wave generator 212c is the same as output voltage of the D/A converter 212a when the value of image data is "FFh" (i.e., the peak value is minimum). Accordingly, when the value of image data is "FFh", the output from the comparator 212e is at a high level for the entire one-pixel period.

If the value of the control data is "80h", the peak value of the triangular wave generated by the triangular wave generator 212c is a value to set the pulse width of the pulse signal outputted from the comparator 212e to 80% of one period of the triangular wave when the value of the image data is "FFh".

Further, if the value of the control data is "00h", the peak value of the triangular wave generated by the triangular wave generator 212c is a value to set the pulse width of the pulse signal outputted from the comparator 212c to 60% of one period of the triangular wave when the value of the image data is "FFh".

Note that even if the peak value of the triangular wave is changed, the pulse width of the pulse signal in a case where the value of the image data is "00h" can be approximately constant (0) by controlling the output voltage of the D/A converter 212a when the value of the image data is "00h" to correspond to the minimum value of the triangular wave.

Further, in the triangular wave generator 212b, the peak value is controlled in the same manner as that in the triangular wave generator 212c.

As described above, according to the present embodiment, the maximum density of an output image can be changed, and further, the degradation of tonality representation when forming the output image can be prevented.

Second Embodiment

Figure 21:
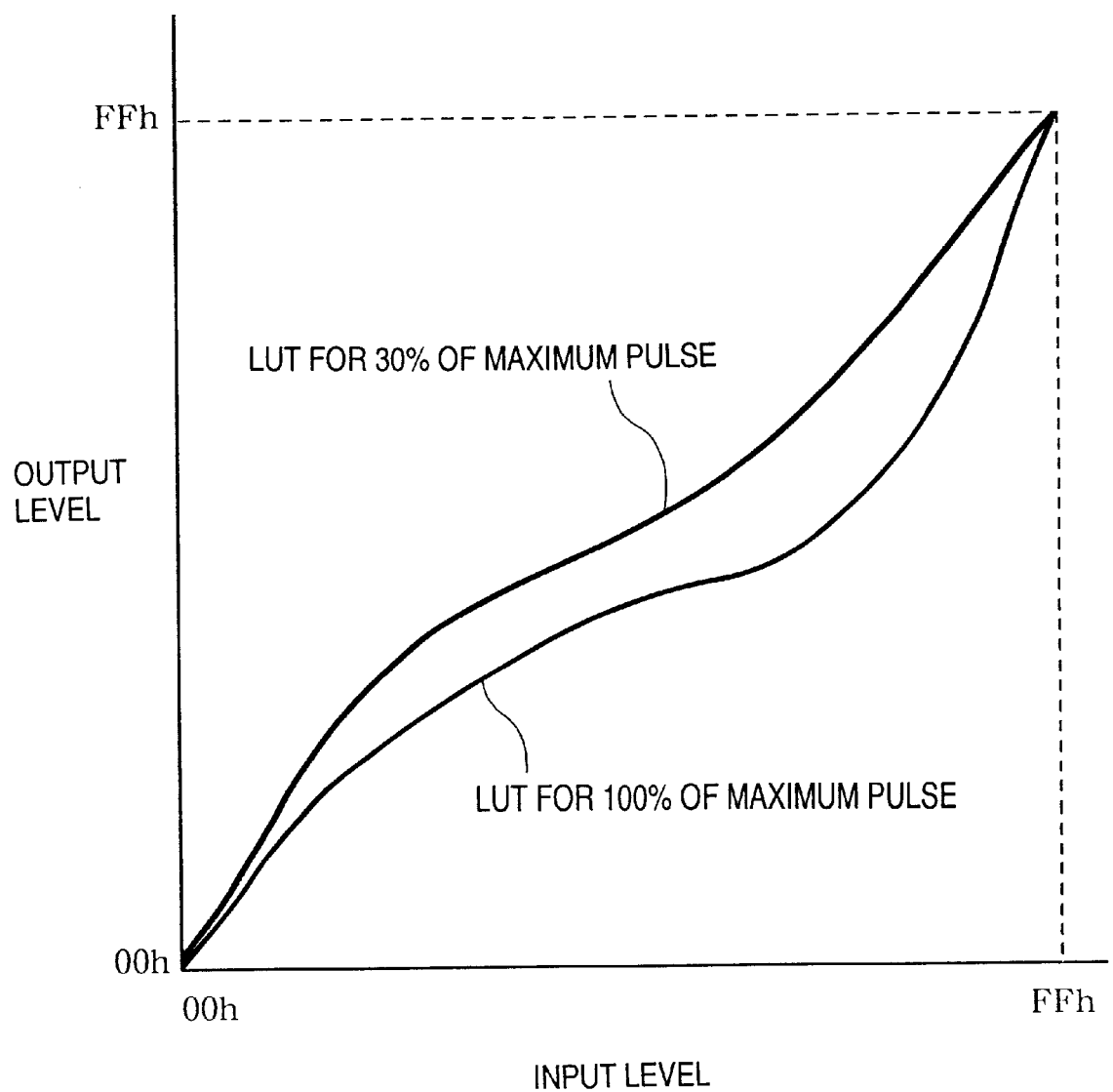
FIG. 21 is a graph showing the LUT according to a second embodiment of the present invention.

FIG. 21 shows the LUT according to a second embodiment of the present invention. In the first embodiment, when the maximum pulse width is changed by the span change signal, the printer characteristic of the present digital copying machine changes. Accordingly, the tonality characteristic of an output image might somewhat change by using only the LUT characteristic curve as shown in FIG. 10. Then, in the present embodiment, a plurality of LUT's for 30%, 100%, and an intermediate percentage of the maximum pulse width are prepared in advance, and the CPU 214 selects one of these LUT's in accordance with the span change signal. By this arrangement, the tonality representation can be further improved in comparison with the first embodiment. Since the second embodiment has the same construction as that of the first embodiment except the above-described arrangement, explanation of the construction of the second embodiment will be omitted.

Figure 22:
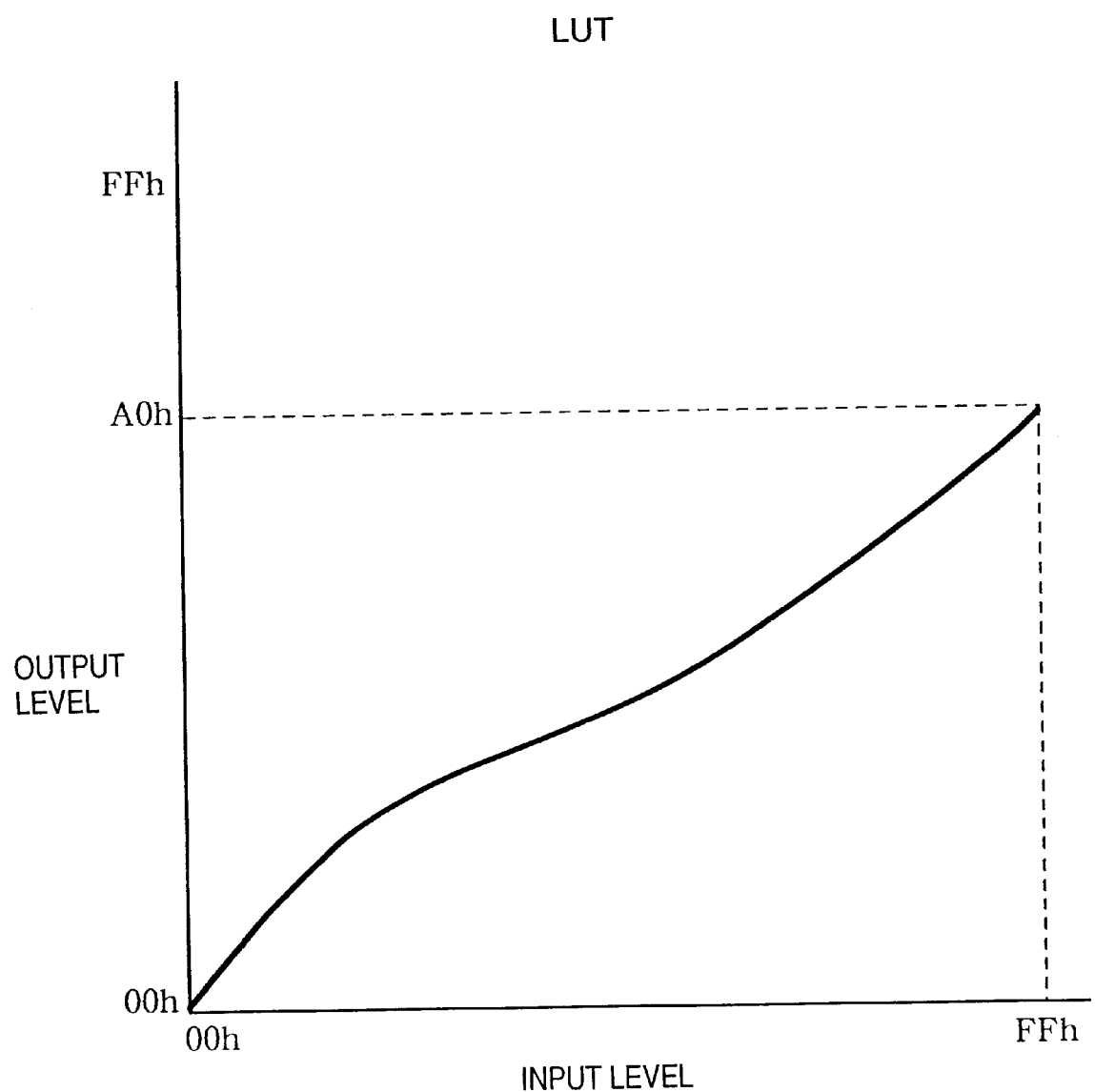
FIG. 22 is a graph showing the LUT according to a modification to the second embodiment of the present invention.

Note that in addition to the above-described control by using the span change signal, an LUT as shown in FIG. 22 may be used. This LUT includes characteristic data for tonality correction to somewhat suppress the level of input image data and outputting the corrected image data.

Third Embodiment

Generally, when a color image including a natural picture and black characters is printed, to reproduce the black characters, image formation is often made in a density higher than that for representing the natural picture, so as to clearly reproduce fine portions of the black characters. Accordingly, in the present embodiment, the controller 200 sets the maximum pulse width to 30% for image formation of a natural picture with the maximum density value "1.5", while sets the maximum pulse width to 100% for image formation of a character with the maximum density value "2.0", instead of changing the span of the analog video signal AVD as in the first and second embodiments. In this case, the controller 200 outputs the span change signal in accordance with the control signal SEN outputted from the black character detector 220. Since the third embodiment has the same construction as that of the first embodiment except the above-described arrangement, explanation of the construction of the third embodiment will be omitted.

According to the present embodiment, when an original image includes a natural picture and black characters, the maximum density value in a natural picture area is set to "1.5" to improve highlight reproducibility, and the maximum density value in a black character area is set to "2.0" for clear reproduction. Accordingly, a problem of bad color reproduction in a reproduced natural picture area due to the reproduction of a character area in a high density can be prevented.

Fourth Embodiment

In a fourth embodiment, the span change signal is controlled in accordance with the control signal SEN, and the maximum density value is changed in accordance with the type of an image included in an original image, as described in the third embodiment. Further, in the fourth embodiment, in case of a natural picture area, image formation is made with 200 lines for excellent highlight reproduction, while in case of a black character area, image formation is made with 400 lines so as to reproduce fine portions. The above-described control signal SEN, outputted from the black character detector 220, is also used as a line number change signal for the selector 212f in the PWM 212. By this control, further excellent tonality representation is attained in comparison with the third embodiment.

Other Embodiment

Note that the present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

Further, in the above described embodiments, the electrophotographic image forming apparatus has been described, however, the present invention is not limited to this apparatus. The present invention is also applicable to an image processing apparatus which uses pulse width modulation such as a thermal-transfer type image processing apparatus and a dot-diameter modulation type ink-jet image processing apparatus.

In other words, the foregoing description of the embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An image processing apparatus comprising:
    pulse-width modulation means for generating a pulse signal having a pulse width corresponding to input image data by performing pulse width modulation based on the image data; and
    change means for changing a maximum pulse width of the pulse signal, which can be outputted by said pulse-width modulation means, in accordance with an image processing mode without changing a minimum pulse width of the pulse signal in any image processing mode,
    wherein the maximum pulse width is a pulse width of the pulse signal outputted from said pulse-width modulation means when a density level of the input image data is at a maximum level, and the minimum pulse is a pulse width of the pulse signal outputted from said pulse-width modulation means when a density level of the input image data is at a minimum level.

2. The apparatus according to claim 1, further comprising printing means for printing density modulation of an image represented by said pulse signal, based on the pulse signal outputted from said pulse-width modulation means,
    wherein said change means limits a maximum density of the image printed by said printing means by changing said maximum pulse width.

3. The apparatus according to claim 1, further comprising area detection means for detecting a predetermined area included in an image represented by said image data,
    wherein said change means changes said maximum pulse width in accordance with the result of detection by said area detection means.

4. The apparatus according to claim 3, wherein when said area detection means detects a black character area, said change means changes said maximum pulse width such that said print means prints the black character area in a density higher or lower than that in the other area.

5. The apparatus according to claim 3, wherein said pulse-width modulation means includes selection means for selecting a resolution of the image printed by said print means,
    and wherein said selection means changes said resolution in accordance with the result of detection by said area detection means.

6. The apparatus according to claim 1, wherein said pulse-width modulation means includes generation means for generating a pattern signal of a predetermined period, and wherein said pulse-width modulation means generates said pulse signal by comparing said pattern signal generated by said generation means with a signal representing said image data.

7. The apparatus according to claim 6, wherein said change means changes a density level of said image data.

8. The apparatus according to claim 1, further comprising correction means for correcting a density characteristic of said image data and outputting said corrected image data to said pulse-width modulation means,
wherein said correction means changes a correction characteristic in accordance with said maximum pulse width.

9. The apparatus according to claim 1, wherein said image data is constituted by a plurality of color component data,
and wherein said pulse-width modulation means performs pulse width modulation on each color component,
further wherein said change means changes said maximum pulse width for each color component.

10. The apparatus according to claim 9, further comprising image formation means for forming a color image based on pulse signals generated by said pulse-width modulation means.

11. An image processing apparatus comprising:
input means for inputting image signals for a plurality of color components constituting a color image; and
modulation means for generating pulse-width modulation signals by performing pulse-width modulation based on said image signals for the respective color components,
wherein pulse-width modulation signals, which can be generated by said modulation means, having maximum pulse widths determined for the respective color components are different from each other for the respective color components, and pulse-width modulation signals, which can be generated by said modulation means, having minimum pulse widths determined for the respective color components are approximately equal to each other for the respective color components, and
wherein the maximum pulse widths for the respective color components are pulse widths of the pulse-width modulation signals when a respective density level of the image signals is at a maximum level, and the minimum pulse widths for the respective color components are pulse widths of the pulse-width modulation signals when a respective density level of the image signals is at a minimum level.

12. The apparatus according to claim 11, wherein said image signals inputted by said input means are digital image data,
and wherein said modulation means includes:
generation means for generating a pattern signal of a predetermined period;
conversion means for converting said digital image data into analog image signals such that the signals have voltage values corresponding to said maximum pulse widths determined for the respective color components; and
generating means for generating said pulse-width modulation signals by comparing said analog image signals to said pattern signal.

13. The apparatus according to claim 11, wherein said change means includes:
generation means for generating a pattern signal of a predetermined period having a dynamic range corresponding to said maximum pulse widths determined for the respective color components; and
generating means for generating said pulse-width modulation signals by comparing said image signals with said pattern signal.

14. The apparatus according to claim 11, further comprising image formation means for forming a color image based on said pulse-width modulation signals outputted by said modulation means.

15. The apparatus according to claim 14, further comprising determination means for determining said maximum pulse widths for the respective color components.

16. The apparatus according to claim 15, wherein said image formation means includes:
an image holder;
charging means for charging said image holder to a predetermined potential prior to formation of an electrostatic latent image; and
exposure means for performing exposure with respect to said image holder by driving a light emitting body based on said pulse-width modulation signals,
and wherein said determination means includes:
measurement means for measuring a surface potential of said image holder; and
examination means for supplying a pulse-width modulation signal with a predetermined pulse width to said exposure means so as to perform exposure with respect to said image holder, then causing said measurement means to measure the surface potential of said image holder, and examining the relation between the pulse width and the surface potential of said image holder, based on the result of measurement by said measurement means,
wherein said determination means determines said pulse widths for the respective color components based on the relation between the pulse width and the surface potential of said image holder.

17. The apparatus according to claim 16, wherein said charging means charges said image holder to approximately the same potential for the respective color components.

18. An image processing apparatus comprising:
input means for inputting a first color component signal and a second color component signal constituting a color image signal; and
pulse-width modulation signal generation means for generating pulse-width modulation signals by respectively comparing said first and second color component signals with a pattern signal of a predetermined period,
wherein the relative relation between said pattern signal and said first color component signal is different from that between said pattern signal and said second color component signal such that said pulse-width modulation signals generated by said pulse-width modulation signal generation means, have different maximum pulse widths for said first color component and said second color component and have approximately the same minimum pulse widths for said first color component and said second color component, and
wherein the maximum pulse widths for the first and second color components are pulse widths of the pulse-width modulation signals when a respective density level of said first and second color component signals is at a maximum level, and the minimum pulse widths for the first and second color components are pulse widths of the pulse-width modulation signals when a respective density level of said first and second color component signals is at a minimum level.

19. The apparatus according to claim 18, wherein an amplitude value of said pattern signal used for said first color component signal is different from that of said pattern signal used for said second color component signal such that the relative relation between said pattern signal and said first color component signal is different from that between said pattern signal and said second color component signal.

20. The apparatus according to claim 18, further comprising correction means for correcting signal levels of said first and second color component signals such that the relative relation between said pattern signal and said first color component signal is different from that between said pattern signal and said second color component signal.

21. The apparatus according to claim 18, further comprising: image formation means for forming a color image based on said pulse-width modulation signals generated by said pulse-width modulation signal generation means.

22. The apparatus according to claim 21, wherein said image formation means performs control in a manner such that a process condition for image formation based on said first color component signal is different from that for image formation based on said second color component signal.

23. An image processing method comprising:
a pulse width modulation step of generating a pulse signal having a pulse width corresponding to input image data by performing pulse width modulation based on the image data; and
a change step of changing a maximum pulse width of the pulse signal, which can be outputted in accordance with an image processing mode without changing a minimum pulse width of the pulse signal in any image processing mode,
wherein the maximum pulse width is a pulse width of the pulse signal generated in said pulse-width modulation step when a density level of the input image data is at a maximum level, and the minimum pulse is a pulse width of the pulse signal generated in said pulse-width modulation step when a density level of the input image data is at a minimum level.

24. An image processing method comprising:
an input step of inputting image signals for a plurality of color components constituting a color image; and
a modulation step of generating pulse-width modulation signals by performing pulse-width modulation based on said image signals for the respective color components,
wherein at said modulation step, pulse-width modulation signals having maximum pulse widths determined for the respective color components are different from each other for the respective color components, and pulse-width modulation signals having minimum pulse widths determined for the respective color components are approximable equal to each other for the respective color components, and
wherein at said modulation step, the maximum pulse widths for the respective color components are pulse widths of the pulse-width modulation signals when a respective density level of the input image signals is at a maximum level, and the minimum pulse widths for the respective color components are pulse widths of the pulse-width modulation signals when a respective density level of the image signals is at a minimum level.

25. An image processing method comprising:
an input step of inputting a first color component signal and a second color component signal constituting a color image signal; and
a pulse-width modulation signal generation step of generating pulse-width modulation signals by respectively comparing said first and second color component signals with a pattern signal of a predetermined period,
wherein the relative relation between said pattern signal and said first color component signal is different from that between said pattern signal and said second color component signal such that said pulse-width modulation signals generated at said pulse-width modulation signal generation step, have different maximum pulse widths for said first color component and have approximately the same minimum pulse widths for said first color component and said second color component, and
wherein the maximum pulse widths for the first and second color components are pulse widths of the pulse-width modulation signals when a respective density level of the first and second color component signals is at a maximum level, and the minimum pulse widths for the first and second color components are pulse widths of the pulse-width modulation signals when a respective density level of said first and second color component signals is at a minimum level.

* * * * *

UNITED STATES PATENT AND TRADEMARK OFFICE
CERTIFICATE OF CORRECTION

PATENT NO.    : 6,320,605 B1                                               Page 1 of 1
DATED         : November 20, 2001
INVENTOR(S)   : Yuichi Ikeda et al.

It is certified that error appears in the above-identified patent and that said Letters Patent is hereby corrected as shown below:

Column 2,
Line 13, "cross sectional" should read -- cross-sectional --.

Column 3,
Line 12, "machine" should read -- Machine --; and
Line 16, "cross sectional" should read -- cross-sectional --.

Column 5,
Line 51, "L[]z" should be deleted.

Column 6,
Line 18, "Se" should read -- 5e --; and
Line 44, "Sa" should read -- 5a --.

Column 14,
Line 5, "above described" should read -- above-described --.

Column 18,
Line 7, "approximable" should read -- approximately --.

Signed and Sealed this

Twenty-fifth Day of June, 2002

Attest:

JAMES E. ROGAN
Attesting Officer           Director of the United States Patent and Trademark Office